(12) United States Patent
Fujii

(10) Patent No.: US 7,660,447 B2
(45) Date of Patent: Feb. 9, 2010

(54) DETECTION OF FINGERPRINT DISTORTION BY DEFORMATION OF ELASTIC FILM OR DISPLACEMENT OF TRANSPARENT BOARD

(75) Inventor: Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 11/336,926

(22) Filed: Jan. 23, 2006

(65) Prior Publication Data

US 2007/0076924 A1    Apr. 5, 2007

(30) Foreign Application Priority Data

Oct. 4, 2005    (JP)    ............... 2005-291780

(51) Int. Cl.
*G06K 9/00* (2006.01)
*G01B 11/00* (2006.01)
*G01B 11/14* (2006.01)

(52) U.S. Cl. ............... 382/124; 702/139; 356/395; 356/396; 356/615

(58) Field of Classification Search ............... 382/115, 382/116, 124–127; 73/800; 356/32, 395, 356/396, 614–620; 702/139
See application file for complete search history.

(56) References Cited

U.S. PATENT DOCUMENTS

| | | | | |
|---|---|---|---|---|
| 4,047,585 A * | 9/1977 | Dlugos | ............... | 177/210 R |
| 4,120,585 A * | 10/1978 | DePalma et al. | ............... | 356/71 |
| 4,322,163 A * | 3/1982 | Schiller | ............... | 356/71 |
| 4,340,300 A * | 7/1982 | Ruell | ............... | 356/71 |
| 5,230,025 A * | 7/1993 | Fishbine et al. | ............... | 382/127 |
| 5,629,764 A * | 5/1997 | Bahuguna et al. | ............... | 356/71 |
| 5,815,252 A * | 9/1998 | Price-Francis | ............... | 356/71 |
| 5,828,773 A * | 10/1998 | Setlak et al. | ............... | 382/126 |
| 5,991,467 A | 11/1999 | Kamiko | ............... | 382/312 |
| 6,064,753 A | 5/2000 | Bolle et al. | ............... | 382/125 |
| 6,131,464 A | 10/2000 | Pare, Jr. et al. | ............... | 73/714 |
| 6,912,299 B1 | 6/2005 | Hoshino | ............... | 382/124 |
| 7,479,903 B2 * | 1/2009 | Otsuka et al. | ............... | 341/22 |
| 2003/0030541 A1 | 2/2003 | Tokorotani | ............... | 340/5.52 |
| 2004/0215615 A1 * | 10/2004 | Larsson et al. | ............... | 707/9 |

(Continued)

FOREIGN PATENT DOCUMENTS

JP    10-269340 A *    9/1998

(Continued)

OTHER PUBLICATIONS

Korean Patent Office Action, mailed Jan. 24, 2007, and issued in corresponding Korean Patent Application No. 10-2006-17750.

(Continued)

*Primary Examiner*—Brian P Werner
*Assistant Examiner*—Barry Drennan
(74) *Attorney, Agent, or Firm*—Staas & Halsey LLP

(57) ABSTRACT

A fingerprint matching apparatus includes a fingerprint distortion detection unit for detecting whether or not a correlation object intentionally distorts the finger put on the fingerprint reading face by, for example, applying excessively large force to the finger, or dragging or rolling the finger. With this configuration, it is possible to prevent a distorted fingerprint image from flowing into the fingerprint matching apparatus and therefore the probability of accurate fingerprint correlation can be increased.

8 Claims, 29 Drawing Sheets

U.S. PATENT DOCUMENTS

2005/0146707 A1    7/2005  Wada et al. ................... 356/28

FOREIGN PATENT DOCUMENTS

| JP | 11-225998 | 8/1999 |
| JP | 2001-154795 | 6/2001 |
| JP | 2002-298126 | 10/2002 |
| JP | 2003-58870 | 2/2003 |
| JP | 2003-274947 | 9/2003 |
| JP | 3473658 | 9/2003 |
| JP | 2005-65617 | 3/2005 |
| JP | 2005-195464 | 7/2005 |
| KR | 2002-0014271 | 2/2002 |
| KR | 20-0352666 | 5/2004 |

OTHER PUBLICATIONS

N. Ratha, et al., "Automatic Fingerprint Recognition Systems", pp. 80-86.

Dorai, et al., "Dynamic Behavior Analysis in Compressed Fingerprint Videos", IEEE Transactions on Circuits and Systems for Video Technology, vol. 14, No. 1, Jan. 2004.

European Search Report for corresponding European Patent Application No. 06100945.2, dated Mar. 23, 2006.

* cited by examiner

DETECTION OF FINGERPRINT DISTORTION BY DEFORMATION OF ELASTIC FILM OR DISPLACEMENT OF TRANSPARENT BOARD

BACKGROUND OF THE INVENTION

1. Field of the Invention

The present invention relates to a fingerprint matching apparatus, and more particularly to a fingerprint matching apparatus including a fingerprint distortion detection unit which detects that a correlation object (object person) intentionally distorts a fingerprint because the object wishes that the fingerprint correlation fails.

2. Description of the Related Art

Recently, immigration investigation of each country has been strict. Lately, there has been proposed an idea of strict immigration investigation which uses biometrics. This idea acquires images of the face and the fingerprint of an immigrant or a migrant and employs biometrics certification to judge whether or not the immigrant or the migrant is a person on a blacklist. Further, there has been proposed another technique that an IC chip, in which biometrics data such as face and fingerprint images are recorded along with identification of the immigrant or migrant, is embedded in a passport and strictly verifies the passport holder with reference to the data in the IC chip. Still further, since an electronic passport can be read by a machine, there is proposed a rapid self-service immigration investigation, in which immigration investigation is performed by an immigrant or a migrant operating a machine to read a passport in a booth with no stuff clerk and inputting the face and the fingerprint images. If such immigration investigation without a stuff clerk is accomplished, it is important to verify the passport holder and correlate the passport holder with a person on a blacklist.

Various techniques have been conventionally proposed to improve the accuracy in fingerprint correlation.

For example, if a correlation object presses the finger on a fingerprint reading face of a fingerprint matching apparatus too weakly or too strongly, an accurate fingerprint image cannot be acquired. As a solution, there is a technique in which a fingerprint is read at the time when a constant pressure is applied to the fingerprint reading face by the finger (Patent Reference 1).

Another technique discloses that a body part of a correlation object is forced to be held on a reading position, and biometrics data is read in the holding state, so that the biometrics data is finely read even if the correlation object does not get used to operation of the correlation matching unit (Patent Reference 2).

Conventionally, a fingerprint matching unit is used for identification verification, in which a correlation object carries out fingerprint correlation and, if the object is not verified for some reason, the object attempts another fingerprint correlation or takes alternative means for identification verification. Since a correlation object him/herself is harmed by failure in fingerprint correlation, such a conventional fingerprint matching unit asks the correlation object to re-put the finger on the fingerprint reading face of the fingerprint matching unit such that the fingerprint correlation succeeds.

On the other hand, if such a conventional fingerprint matching unit is used for finding a person on a blacklist, it is important to accurately judge whether or not a fingerprint image of a correlation object is identical to any fingerprint image previously retained in a blacklist. If a correlation object is really a person on a blacklist, success in fingerprint correlation, that is judgment to be a person on a blacklist, is not preferable for the object. Therefore, there is a possibility that the correlation object intentionally fails fingerprint correlation by distorting the fingerprint. However, a fingerprint matching unit has a limited capability of correlation, intentional distortion of the fingerprint by the correlation object results in an increase in the probability of fingerprint correlation failure. If fingerprint correlation fails, the correlation object is judged not to be a person on a blacklist. In this case, the fingerprint matching unit misses finding the correlation object to be a person on a blacklist.

[Patent Reference 1] Japanese Patent Application Laid-OPEN NO. HEI 11-225998

[Patent Reference 2] Japanese Patent Application Laid-OPEN NO. 2003-058870

SUMMARY OF THE INVENTION

The object of the present invention is to solve the above problems of the conventional technique by installing a fingerprint distortion detection unit for detecting that a correlation object improperly puts the finger on a fingerprint reading face into a fingerprint matching apparatus. The presence of the fingerprint matching apparatus makes it possible to, if a correlation object improperly puts the finger, request the object to re-put the finger or notify to a third entity. As a result, it is possible to prevent a distorted fingerprint image from flowing into the fingerprint matching apparatus and the probability of finding a person on a blacklist can be increased.

As a first generic feature, there is provided a fingerprint matching apparatus for reading a fingerprint image of a finger put on a fingerprint reading face of a fingerprint sensor and correlating the fingerprint image with a fingerprint image which has previously been registered, comprising: a fingerprint distortion detection unit for detecting whether or not the finger is properly put on the fingerprint reading face of the fingerprint sensor; and a notification unit for notifying, if the result of the detecting by the fingerprint distortion detection unit is negative, a third entity of the result of the detecting. As a result, since a fingerprint distortion detection unit which detects whether or not a finger of a correlation object is properly put on the fingerprint reading face is installed to a fingerprint matching apparatus, the apparatus asks the object to re-put the finger or notifies a third entity of improper putting of the finger if the correlation object improperly puts the finger. Further, it is possible to prevent a distorted fingerprint image from flowing into the fingerprint matching apparatus, the fingerprint matching unit does not have to spend a time to perform fingerprint correlation on such a distorted fingerprint image and can thereby improve workability of the apparatus.

As a second generic feature, there is provided a fingerprint matching apparatus for reading a fingerprint image of a finger put on a fingerprint reading face of a fingerprint sensor and correlating the fingerprint image with a fingerprint image which has previously been registered, comprising: a fingerprint distortion detection unit for detecting an amount of movement of a member, which moves in accordance with movement of the finger, caused by the movement of the finger; and a notification unit for notifying, if the amount of the movement detected by the fingerprint distortion detection unit is equal to or larger than a predetermined value, a third entity that the amount of the movement of the member is equal to or larger than a predetermined value. As a result, since a fingerprint distortion detection unit which detects whether or not a finger of a correlation object is properly put on the fingerprint reading face is installed to a fingerprint matching apparatus, the apparatus asks the object to re-put the finger or notifies a third entity of improper putting of the finger if the correlation object improperly puts the finger. Further, since it is possible to prevent a distorted fingerprint image from flowing into the fingerprint matching apparatus, the fingerprint matching unit does not have to spend a time to perform fingerprint correlation on such a distorted fingerprint image and can thereby improve workability of the apparatus.

As a third generic feature, there is provided a fingerprint matching apparatus for reading a fingerprint image of a finger put on a fingerprint reading face of a fingerprint sensor and correlating the fingerprint image with a fingerprint image which has previously been registered, comprising: a fingerprint distortion detection unit for detecting whether or not the finger is properly put on the fingerprint reading face; a blacklist fingerprint image database for retaining one of more fingerprint images of persons on a blacklist; a fingerprint retrieval apparatus for retrieving a fingerprint image identical to the first fingerprint image from the second fingerprint images retained in the blacklist fingerprint image database; and a notification unit for notifying, if the result of detecting by the fingerprint distortion detection unit is negative or the blacklist fingerprint image database retains a fingerprint image identical to the first fingerprint image, a third entity that the result of detecting by the fingerprint distortion detection unit is negative or the blacklist fingerprint image database retains a fingerprint image identical to the first fingerprint image. As a result, since a fingerprint distortion detection unit which detects whether or not a finger of a correlation object is properly put on the fingerprint reading face is installed to a fingerprint matching apparatus, the fingerprint matching apparatus can notify the third entity when a correlation object improperly puts the finger or the blacklist fingerprint image database retains a fingerprint image identical to the fingerprint image of the correlation object. Further, it is possible to prevent a distorted fingerprint image from flowing into the fingerprint matching apparatus, so that the probability of finding a person on a blacklist can be increased.

As a fourth generic feature, there is provided a fingerprint sensor for reading a fingerprint image put on a fingerprint reading face, comprising a fingerprint distortion detection unit for detecting whether or not a finger is properly put of the fingerprint reading face. With this fingerprint distortion detection unit, the probability of obtaining a distorted fingerprint image by the fingerprint sensor can be reduced.

As a preferable generic feature if the result of the detecting by the fingerprint distortion detection unit is negative, the fingerprint distortion unit judges whether or not the number of times that the finger is judged not to be properly put is equal to or smaller than a predetermined number, and if the result of the judging is positive, allows re-putting the finger on the fingerprint reading face. In this manner, a correlation object which does not get used to operation of the fingerprint matching apparatus can be discriminated from a person that improperly puts the finger on purpose.

As another preferable feature, if the fingerprint distortion detection unit does not succeed in detecting that the finger is properly put on the fingerprint reading face of the fingerprint sensor in a predetermined time period, the fingerprint sensor does not read the fingerprint image of the finger any longer. That can encourage a correlation object to properly put the finger in a predetermined time period.

As an additional preferable feature, the fingerprint distortion detection unit is arranged on and fixed to the fingerprint reading face of the fingerprint sensor and includes a transparent elastic film on which a pattern for detecting an amount of distortion is attached so that movement of the finger is detected; and the fingerprint distortion detection unit measures an amount of movement of the pattern to judge whether or not the finger is properly put on the fingerprint reading face of the finger print sensor. With this configuration, if a correlation object applies excessively large force to the finger, the pattern for detecting an amount of distortion deforms and observation on the deformation can judge whether or not the correlation object properly puts the finger.

As a further preferable feature, the fingerprint distortion detection unit is arranged on and semi-fixed to the fingerprint reading face of the fingerprint sensor and includes a transparent board on which a pattern for detecting an amount of movement of the finger is attached so that movement of the finger is detected; and the fingerprint distortion detection unit measures an amount of movement of the pattern to judge whether or not the finger is properly put on the fingerprint reading face of the finger print sensor. With this configuration, if a correlation object applies excessively large force to the finger, the pattern for detecting an amount of movement of the finger moves along with the transparent board. Therefore whether or not the correlation object properly puts the finger can be judged by measuring the movement amount of the pattern detecting an amount of movement.

As a still further preferable feature, the fingerprint distortion unit includes a transparent board which is arranged on and semi-fixed to the fingerprint reading face of the fingerprint sensor and measures a pressure applied to the transparent board by the finger to judge whether or not the finger is properly put on the fingerprint reading face of the fingerprint sensor. If a correlation object applies excessively large force to the finger, the pressure varies responsive to the force application and it is therefore possible to judge whether or not a correlation object properly puts the finger by measuring the variation in pressure.

As a still further preferable feature, the fingerprint sensor is semi-fixed to a mount and includes a pattern for detecting an amount of movement so that movement of the finger is detected; and the fingerprint distortion detection unit measures an amount of movement of the pattern to judge whether or not the finger is properly put on the fingerprint reading face of the fingerprint sensor. With this configuration, if a correlation object applies excessively large force to the finger, the fingerprint sensor moves because the sensor is fixed onto an elastic body and the pattern for detecting an amount of movement moves in accordance with the movement of the fingerprint sensor. Measurement of the pattern for detecting an amount of movement can detect whether or not the correlation object properly puts the finger.

As a further preferable feature, the fingerprint sensor is semi-fixed to amount; and the fingerprint distortion detection unit measures a pressure applied to the fingerprint sensor by the finger to judge whether or not the finger is properly put on the fingerprint reading face of the fingerprint sensor. If a correlation object applies excessively large force to the finger, the pressure varies responsive to the force application and it is therefore possible to judge whether or not a correlation objects properly puts the finger by measuring the variation in pressure.

A fingerprint matching unit includes a fingerprint distortion detection unit for detecting whether or not a correlation object improperly puts the finger on the fingerprint reading face. If the fingerprint matching apparatus detects that the correlation object improperly puts the finger, the apparatus can ask the correlation object to re-put the finger or can notify a third entity of improperly putting of the finger. Further, it is possible to prevent a distorted fingerprint image from flowing into the fingerprint matching apparatus, so that the probability of finding a person on a blacklist can be increased.

Other objects and further features of the present invention will be apparent from the following detailed description when read in conjunction with the accompanying drawings.

BRIEF DESCRIPTION OF THE DRAWINGS

FIG. 2(a) represents a film distortion amount detection unit, FIG. 2(b) represents a pressure detection unit, and FIG. 2(c) represents a glass-board movement amount detection unit;

DESCRIPTION OF THE PREFERRED EMBODIMENTS

Various preferred embodiments of the present invention will now be described with reference to the accompanying drawings.

Figure 1:
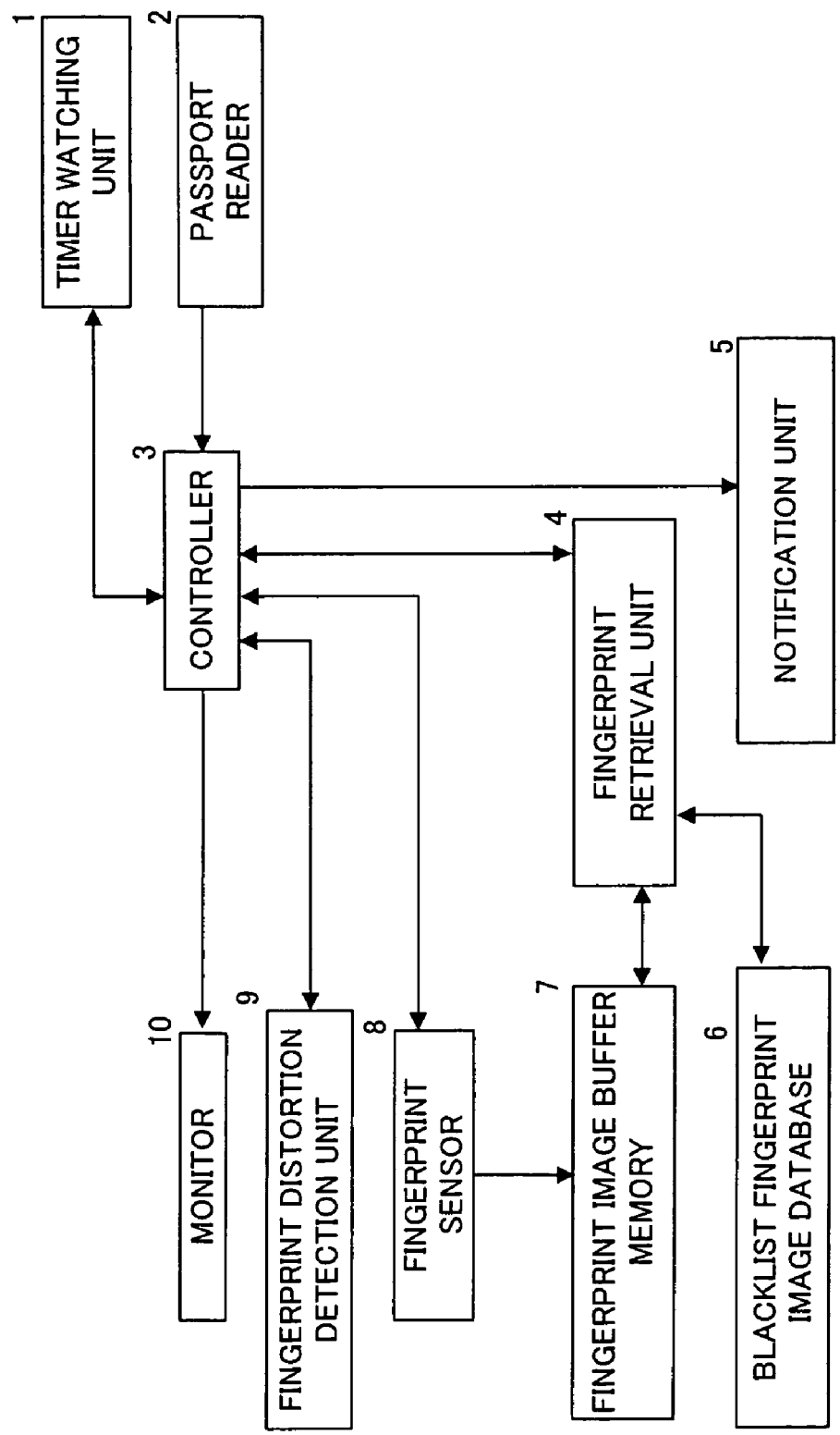
FIG. 1 is a block diagram schematically showing a hardware configuration of a fingerprint matching apparatus according to one embodiment of the present invention.

FIG. 1 is a block diagram schematically showing an embodiment of the present invention. The fingerprint matching apparatus of present invention comprises a timer watching unit 1 for measuring a time period between putting and halting (stably fixing) of the finger of a correlation object, a passport reader 2 for reading the passport of a correlation object, a monitor 10 for displaying messages such as operational instructions to a correlation object, a fingerprint distortion detection unit 9 for detecting whether or not a correlation object intentionally distorts the fingerprint, a fingerprint sensor 8 for obtaining a fingerprint image of an correlation object, a fingerprint retrieval unit 4 for retrieving a fingerprint image identical to that obtained by the fingerprint sensor 8 in a blacklist fingerprint image DB 6, which retains fingerprint images of persons on a blacklist, a notification unit 5 for notifying, if the fingerprint distortion detection unit 9 detects that a correlation object intentionally distorts the fingerprint or the fingerprint retrieval unit 4 finds a fingerprint image identical to that of a correlation object in fingerprint images retained in the blacklist fingerprint image DB 6, to a third entity the fact that the fingerprint distortion detection unit 9 detects that a correlation object intentionally distorts the fingerprint or the fingerprint retrieval unit 4 finds a fingerprint image identical to that of a correlation object in fingerprint images retained in the blacklist fingerprint image DB 6, and a controller 3 which is connected to the timer watching unit 1, the passport reader 2, the monitor 10, the fingerprint distortion detection unit 9, the fingerprint sensor 8, the fingerprint retrieval unit 4 and the notification unit 5.

(A) First Embodiment

A fingerprint matching apparatus according to the first embodiment will now be described with reference accompanying drawings.

Figure 3:
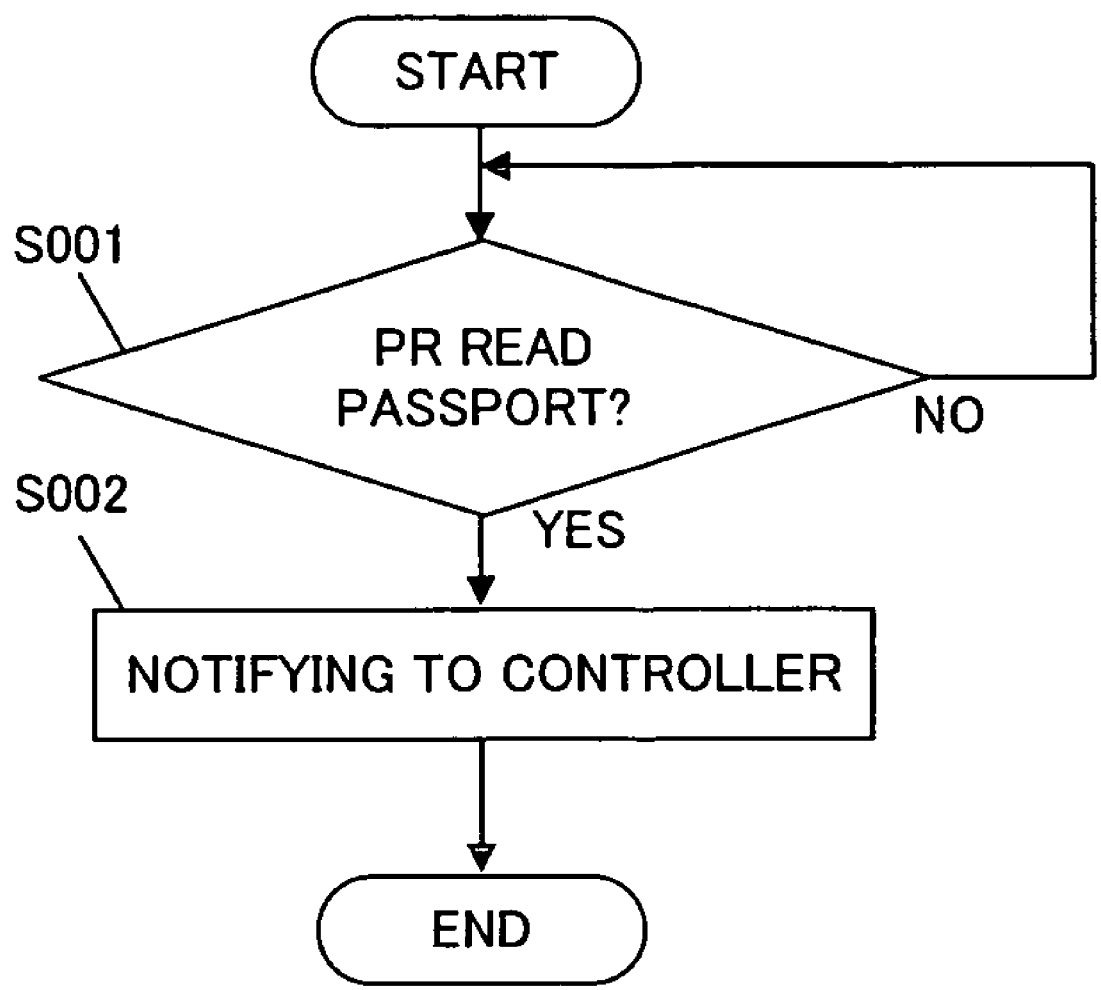
FIG. 3 is a flow diagram showing a succession of procedural steps performed by a passport reader in one embodiment of the present invention.

A succession of procedural steps performed by the passport reader 2 will now be described with reference to FIG. 3.

In step S001, the passport reader 2 judges whether or not the passport reader 2 has read the passport of a correlation object. If the result of the judgment is positive, the passport has been read and the procedural steps proceed to step S002. Conversely, if the result of the judgment is negative, the passport reader 2 returns to step S001.

In step S002, the passport reader 2 notifies the controller 3 that the passport has been read, and terminates the procedural steps.

Figure 4:
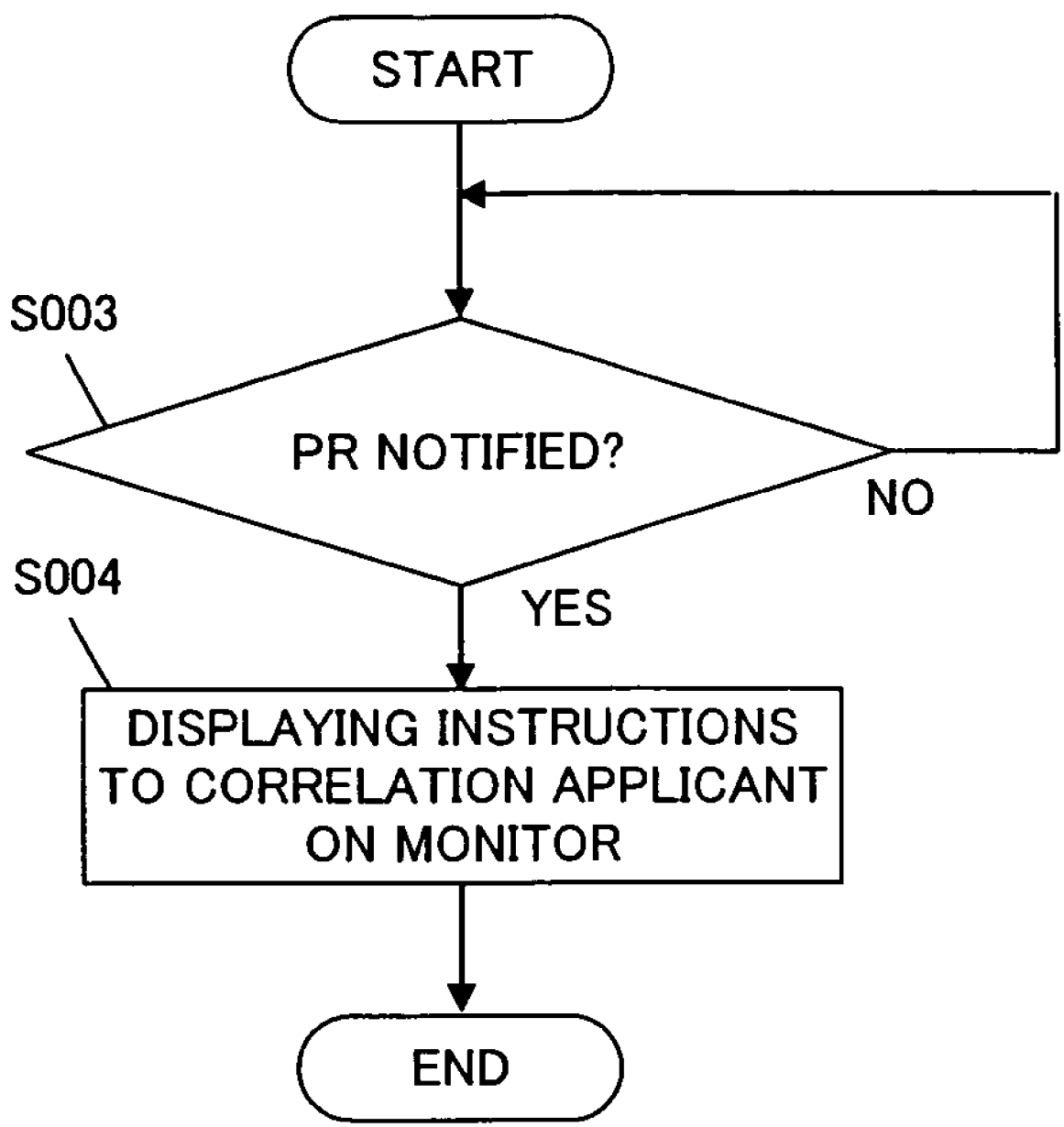
FIG. 4 is a flow diagram showing a succession of procedural steps performed by a controller.

A succession of procedural steps performed by the controller 3 will now be described with reference to FIG. 4.

In step S003, the controller 3 judges whether or not the passport reader 2 has notified the controller 3 that the passport has been read. If the result of the judgment is positive, the procedural steps proceed to step S004 because the passport has been read. On the other hand, if the result of the judgment is negative, the procedural steps return to step S003.

The controller 3 displays an instruction message on the monitor 10 to urge the correlation object to put the finger on a fingerprint reading face, and terminates the procedural steps.

Here, the fingerprint distortion detection unit 9 will now be described.

With the intention of distorting the fingerprint on purpose, the correlation object applies excessively large pressure to the finger to break ridges, drags the finger or rolls the finger. If the skin of the finger (fingertip) of the correlation object is distorted, the fingerprint sensor obtains a distortion fingerprint image, which cause a failure in fingerprint correlation. Therefore, in order to avoid such a correlation failure, the fingerprint sensor has to be prevented from capturing a distorted fingerprint image. As a solution, whether or not a correlation object applies excessively large force to the fingertip is judged so that intentionally distorting of the fingerprint can be detected.

The configuration of the fingerprint distortion detection unit 9 will now be described with reference to FIGS. 24 and 25, which are the side view and the top view of the fingerprint distortion detection unit 9, respectively.

Figure 25:
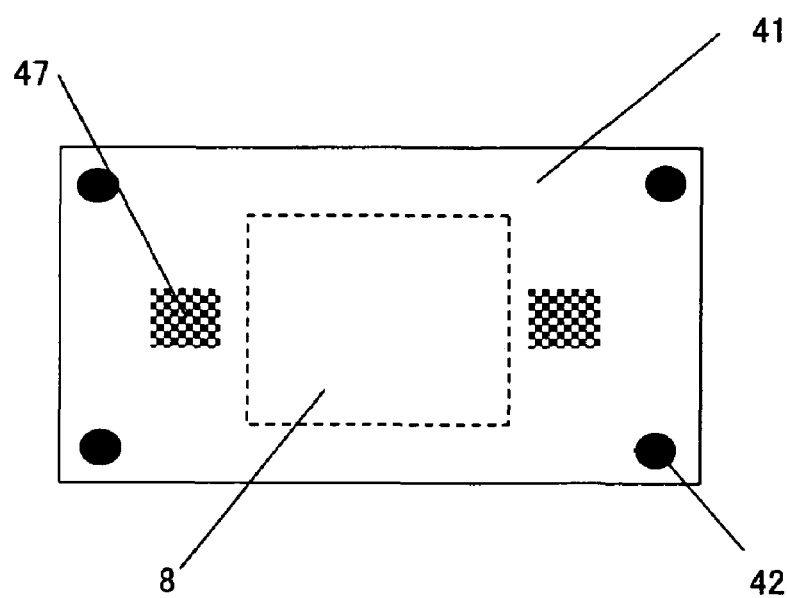
FIG. 25 is an appearance diagram illustrating the top view of the fingerprint distortion detection unit (based on a film distortion amount)

As shown in FIG. 25, the four corners of an elastic transparent film 41 are fixed by fixing feet 42. Patterns 47 for detecting a film distortion amount in the form of check are partially printed on the elastic transparent film 41.

Figure 24:
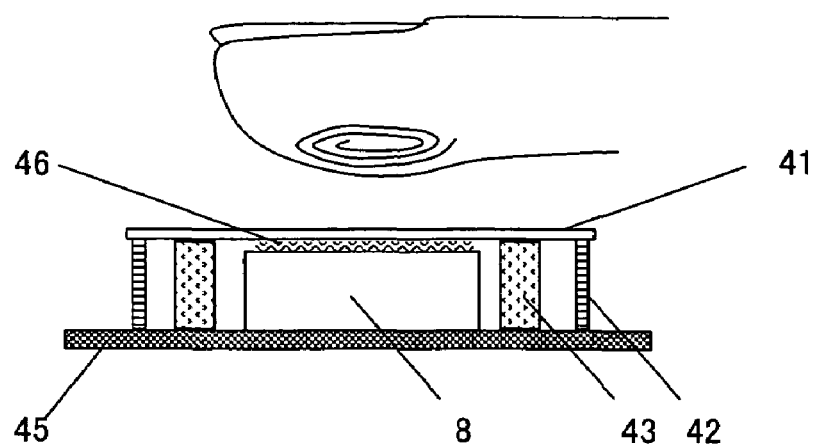
FIG. 24 is an appearance diagram illustrating the side view of a fingerprint distortion detection unit (based on a film distortion amount) according to one embodiment of the present invention.

As shown in FIG. 24, the elastic transparent film 41 is not in intimate contact with the fingerprint reading face but is fixed by the fixing feet so as to form a space between the film and the fingerprint reading face. The space is created in order to detect movement of the finger which movement accompanies distortion of the elastic transparent film 41 when the correlation object put the finger on the film 41. However, the space between the film and the fingerprint reading face causes irregular reflection of light rays and a mismatch of the refractive index to make it impossible to obtain a clear fingerprint image. As a solution, the space is filled with a refractive index adjusting agent 46 to inhibit irregular reflection of light passed through the elastic transparent film 41 on uneven surfaces of the transparent film 41 or the fingerprint reading face, so that a clear fingerprint image can be obtained.

Figure 2A:
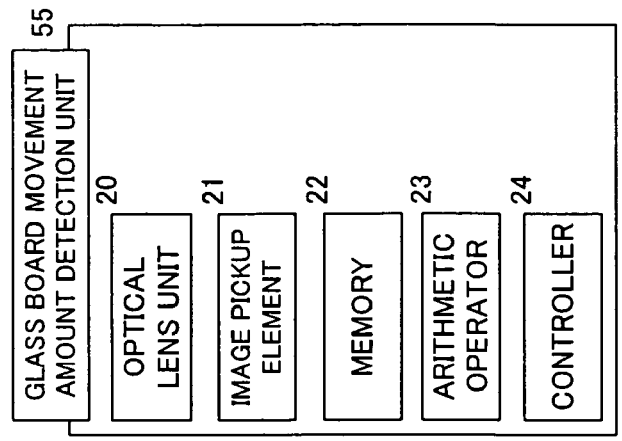
FIGS. 2(a) to 2(c) are block diagrams each of which schematically shows an example of a hardware configuration of the fingerprint distortion detection unit according to the embodiments of the present invention, specifically
Figure 2B:
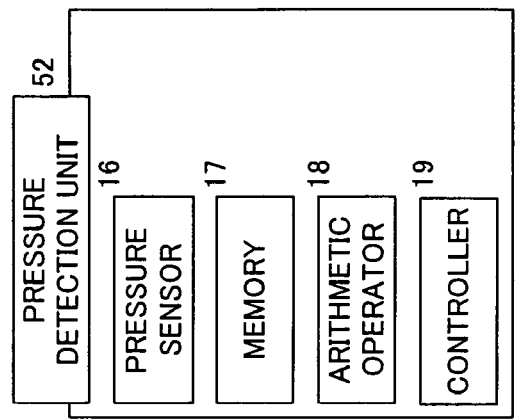
Figure 2C:
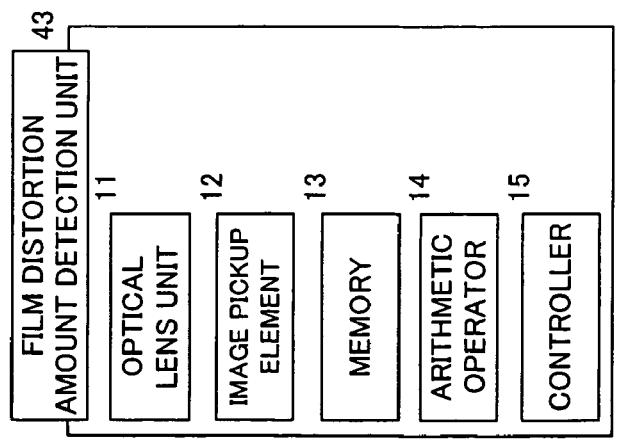

A film distortion amount detection unit 43 is arranged beneath the patterns 47 for detecting a film distortion amount. The film distortion amount detection unit 43 includes an optical lens unit 11, an image pickup element 12, a memory 13, an arithmetic operator 14, and a controller 15 as shown in FIG. 2(*a*). The image pickup element 12 photographs an image of the patterns 47 for detecting a film distortion amount through the optical lens unit 11, and stores the obtained image into the memory 13. The arithmetic operator 14 performs various arithmetic operations, such as a correlative arithmetic operation, on the image stored in the memory 13. These operations are carried out under control of the controller 15.

Figure 26A:
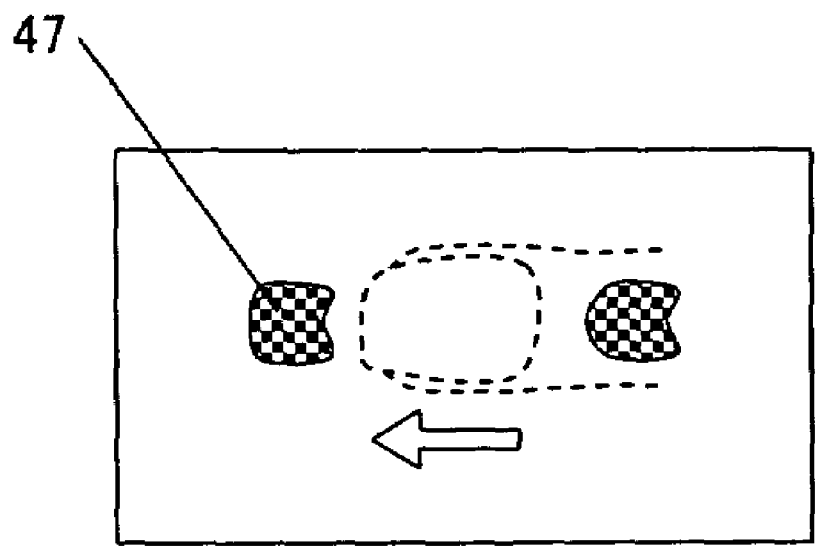
FIGS. 26(a) and 26(b) are appearance diagrams illustrating the top view of the film used in one embodiment of the present invention.
Figure 26B:
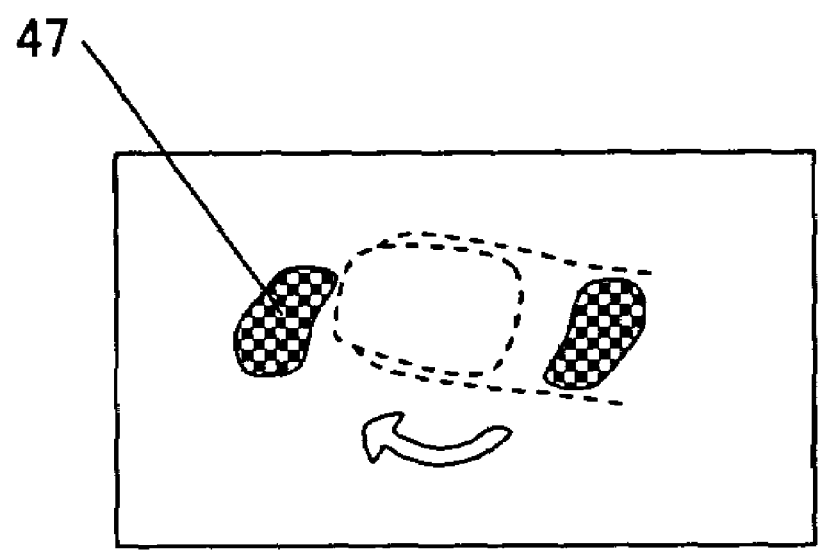

When a correlation object puts a finger on the fingerprint reading face, the elastic transparent film 41 deforms because of the presence of the space between the film 41 and the face. The deformation is used for judgment as to whether or not the correlation object properly puts the finger on the fingerprint reading face. When the correlation object properly puts the finger, the transparent film 41 does not deform much and the patterns 47 for detecting a film distortion amount therefore do not deform and move much. But, if the collation object distorts the fingerprint on purpose by dragging or rolling, large force is applied to the fingertip, resulting in large distortion of the transparent film 41 and large deformation of the patterns 47 for detecting a film distortion amount. For example, if the correlation object drags the finger forward, the transparent film 41 stretches in the direction of the fingertip to move and distort the patterns 47 for detecting a film distortion amount as shown in FIG. 26(*a*). Rolling of the fingertip by the correlation object distorts and moves the patterns 47 for detecting a film distortion amount as shown in FIG. 26(*b*).

Figure 5:
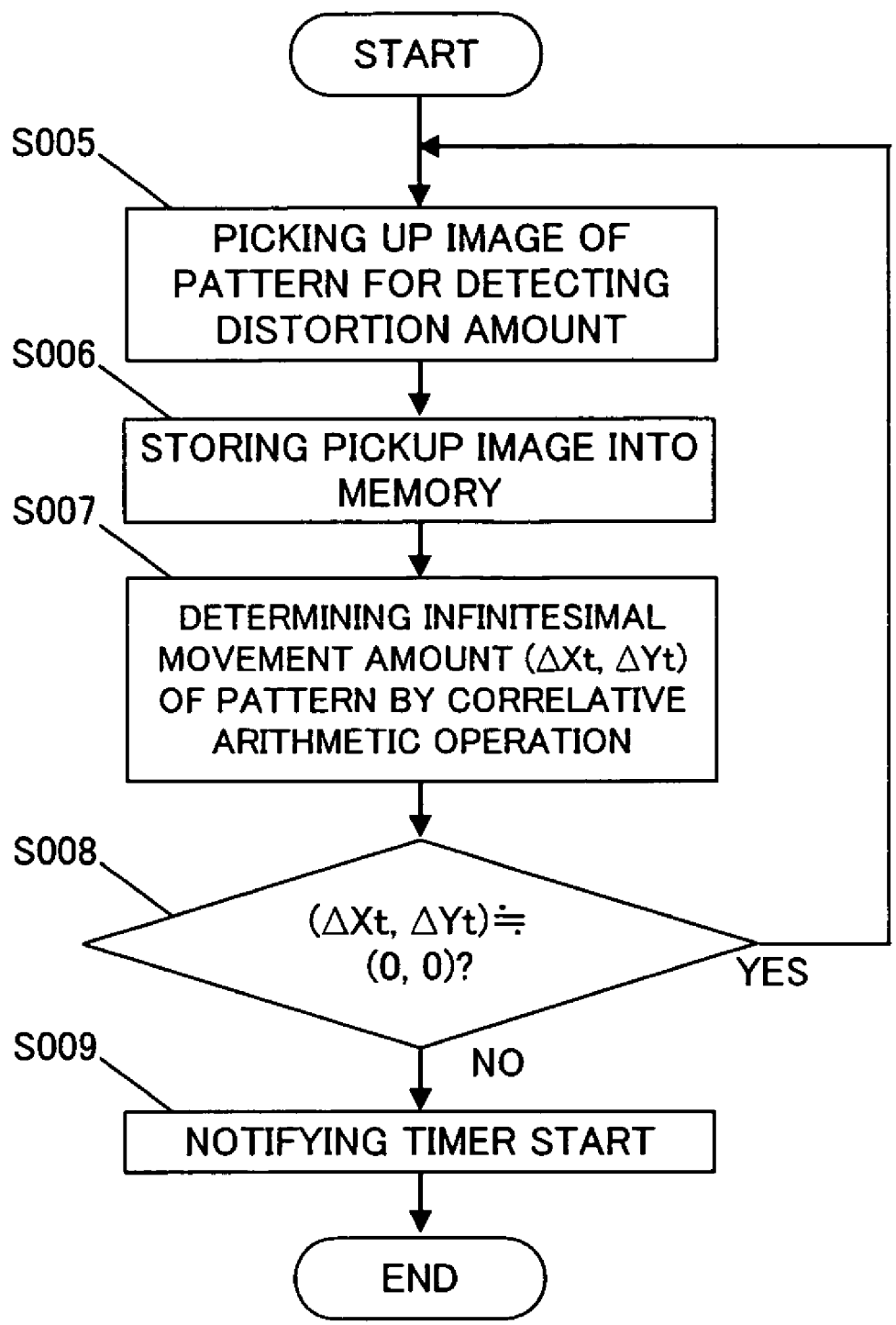
FIG. 5 is a flow diagram showing a succession of procedural steps performed by the fingerprint distortion detection unit.

A succession of procedural steps performed by the fingerprint distortion detection unit 9 will now be described with reference to FIG. 5.

In step S005, the image pickup element 12 obtains a pattern $P_t(x, y)$ for detecting a film distortion amount at the time t, and proceeds to step S006.

In ensuing step S006, the image pickup element 12 stores the obtained pattern $P_t(x, y)$ for detecting a film distortion amount into the memory 13, and proceeds to process S007.

In step S007, the arithmetic operator 14 carries out a correlative arithmetic operation on patterns $P_t(x, y)$ and $P_{t-1}(x, y)$ for detecting a film distortion amount, which has been obtained at time t and t−1, respectively, to determine the infinitesimal movement amount $(\Delta X_t, \Delta Y_t)$ of the pattern for detecting a film distortion amount between time t and t−1. Then the procedural steps proceed to step S008. A correlative arithmetic operation can derive an amount of movement of a pattern for detecting a film distortion amount between time t and t−1 from the result of the correlation arithmetic operation.

In step S008, the arithmetic operator 14 judges whether or not the infinitesimal movement amount $(\Delta X_t, \Delta Y_t)$ of the pattern for detecting a film distortion amount between time t and t−1 is equal to (0, 0) (i.e., $(\Delta X_t, \Delta Y_t)=(0, 0)$). Putting a finger of a correlative object on the fingerprint reading face distorts the film to thereby deform the patterns for detecting a film distortion amount. The deformation changes the value of $(\Delta X_t, \Delta Y_t)$. The instant at which the value $(\Delta X_t, \Delta Y_t)$ varies from 0 is judged to be the state (time point) at which the correlation object puts the finger on the fingerprint reading face. The negative result of the judgment means that the correlation object puts the finger on the fingerprint reading face, and the procedural steps proceed to step S009. Conversely, if the result of the judgment is positive, the procedural steps return to step S005.

In step S009, the fingerprint distortion detection unit 9 notifies the controller 3 of timer start. In the first embodiment, if the correlation object takes a predetermined time or lager to fix the finger since the object puts the finger on the fingerprint reading face, the fingerprint sensor does not read the fingerprint image of the object any longer. Therefore a time length is measured. After that, the fingerprint distortion detection unit 9 terminates the procedural steps.

Figure 6:
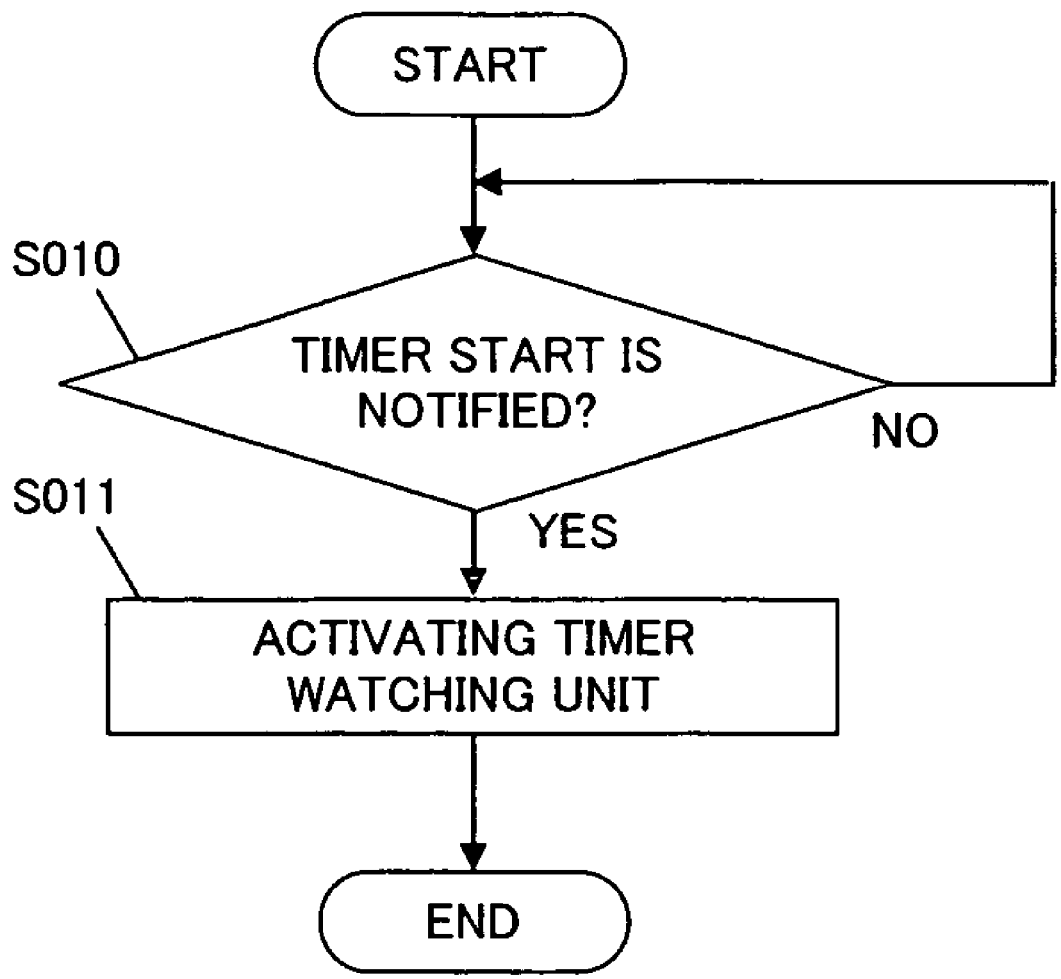
FIG. 6 is a flow diagram showing a succession of procedural steps performed by the controller.

A succession of procedural step performed by the controller 3 will now be described with reference to FIG. 6.

In step S010, the controller 3 judges whether or not the fingerprint distortion detection unit 9 has notified the controller 3 of timer start. If the result of the judgment is positive, the controller 3 has received the notification and proceeds to step S011. On the other hand, if the result of the judgment is negative, the procedural steps return to step S010.

In step S011, the controller 3 activates the timer watching unit 1, and terminates the procedural steps.

Figure 7:
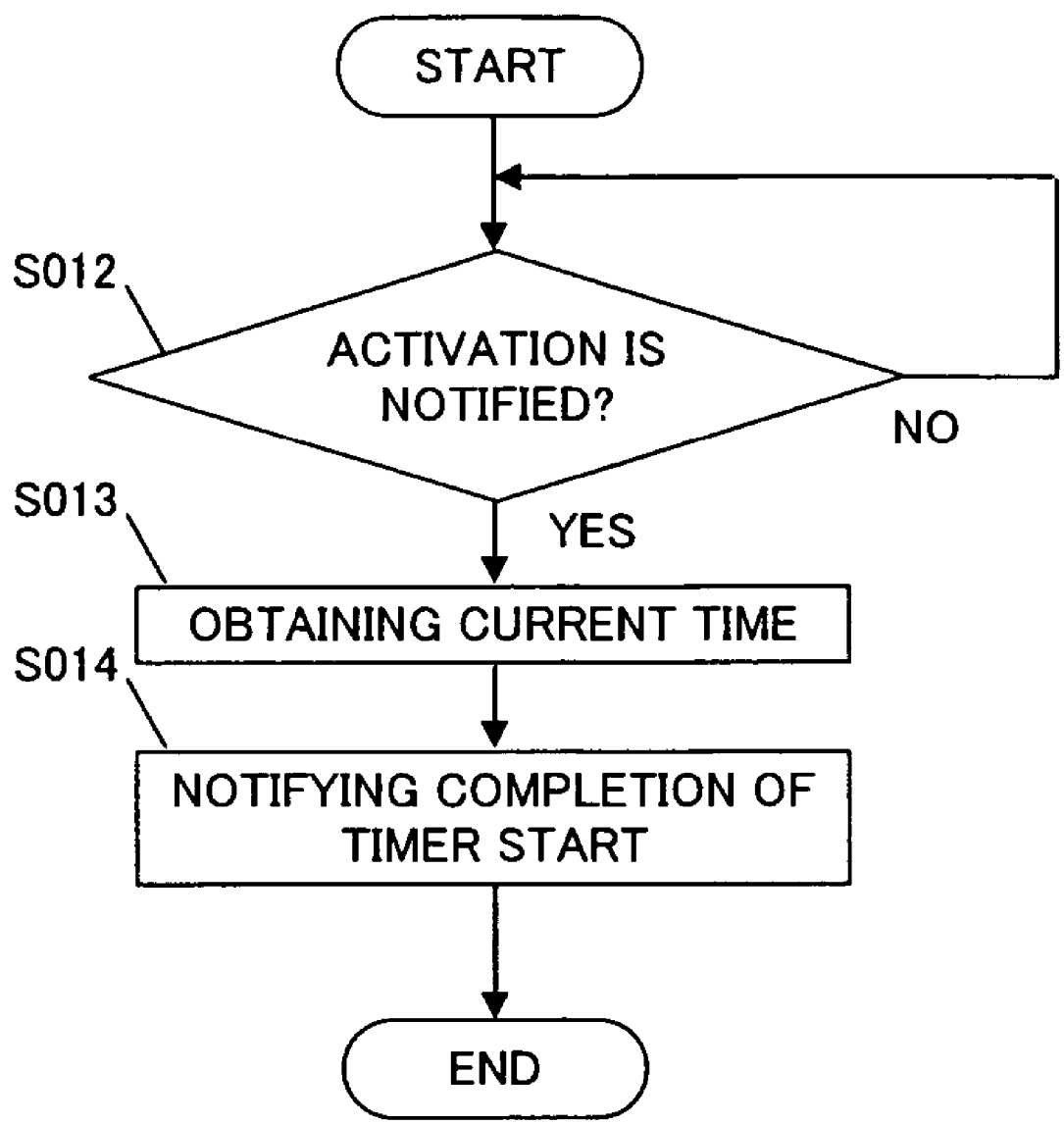
FIG. 7 is a flow diagram showing a succession of procedural steps performed by a timer watching unit.

A succession of procedural steps carried out by the timer watching unit 1 will now be described with reference to FIG. 7.

In step S012, the timer watching unit 1 judges whether or not the controller 3 has notified the timer watching unit 1 of activation. The positive result of the judgment means that the timer watching unit 1 has received the activation notification, and the procedural steps proceed to step S013. If the result of the judgment is negative, the procedural steps return to step S012.

The timer watching unit 1 obtains the current time in step S013, and moves to step S014.

In ensuing step S014, the timer watching unit 1 notifies the controller 3 of completion of timer start, and terminates the procedural steps.

Figure 8:
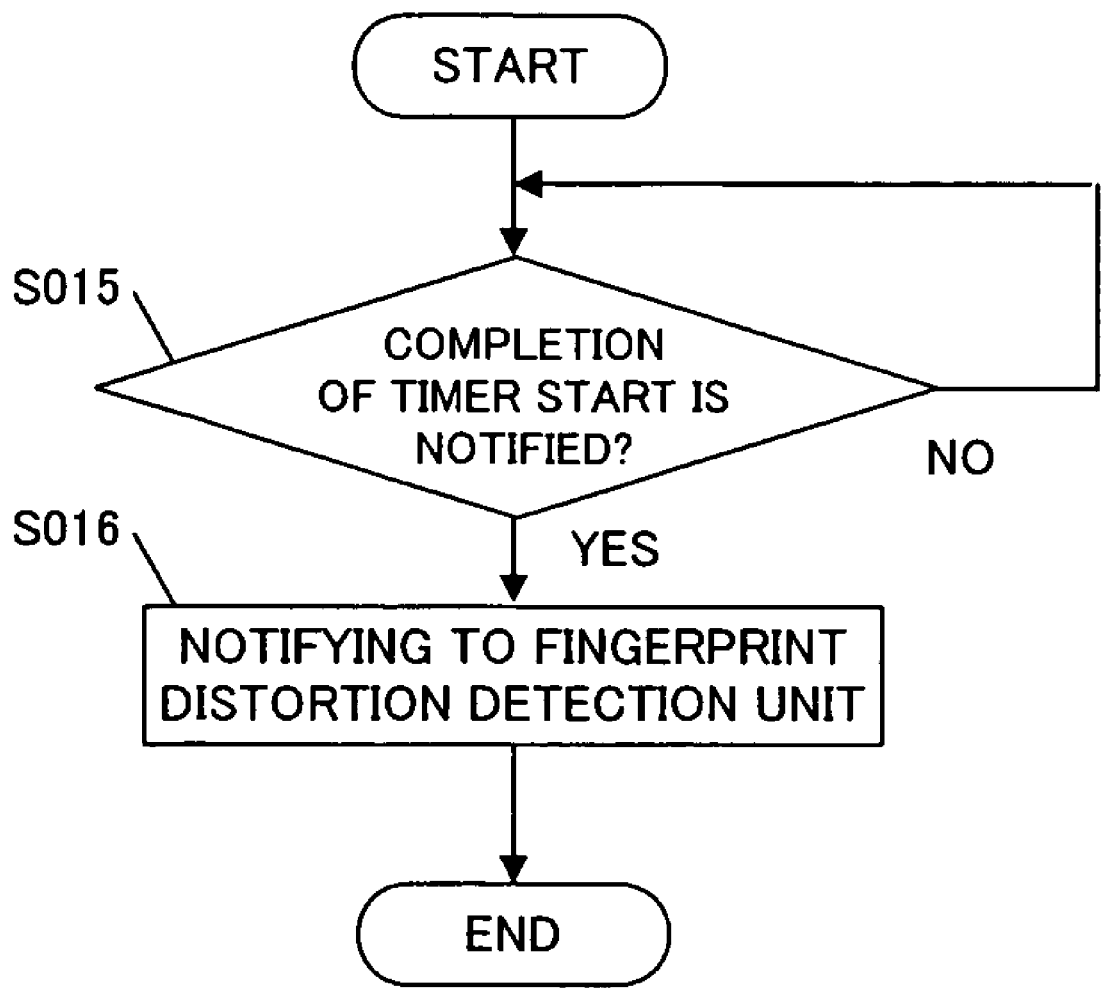
FIG. 8 is a flow diagram showing a succession of procedural steps performed by the controller.

A succession of procedural steps performed by the controller 3 will now be described with reference to FIG. 8.

In step S015, the controller 3 judges whether or not the timer watching unit 1 has notified the controller 3 of completion of timer start. Positive result of the judgment means that the controller 3 has received the notification, and the procedural steps move to step S016. Conversely, if the result of the judgment is negative, the procedural steps return to step S015.

In step S016, the controller 3 notifies the fingerprint distortion detection unit 9 of timer start, and terminates the procedural steps.

A succession of procedural steps performed by the fingerprint distortion detection unit 9 will now be described with reference to FIG. 9.

In step S017, the fingerprint distortion detection unit 9 judges whether or not the controller 3 has notified the fingerprint distortion detection unit 9 of timer start. Positive result of the judgment means that the fingerprint distortion detection unit 9 has received the notification, and the procedural steps move to step S018. Conversely, if the result of the judgment is negative, the procedural steps return to step S017.

The image pickup element 12 obtains a pattern $P_t(x, y)$ for detecting a film distortion amount at the time t in step S018, and the procedural steps proceed to step S019.

In ensuing step S019, the image pickup element 12 stores the obtained pattern $P_t(x, y)$ for detecting a film distortion amount into the memory 13, and proceeds to step S020.

In step S020, the arithmetic operator 14 carries out a correlative arithmetic operation on patterns $P_t(x, y)$ and $P_{t-1}(x, y)$ for detecting a film distortion amount, which has been obtained at time t and t−1, respectively, to determine the infinitesimal movement amount $(\Delta X_t, \Delta Y_t)$ of the pattern for detecting a film distortion amount between time t and t−1. Then the procedural steps proceed to step S021.

In step 021, the arithmetic operator 14 stores the infinitesimal movement amount $(\Delta X_t, \Delta Y_t)$ of the pattern for detecting a film distortion amount determined in step S020 into the memory 13, and the procedural steps proceeds to step S022.

In step S022, the arithmetic operator judges whether or not the infinitesimal movement amount $(\Delta X_t, \Delta Y_t)$ of the pattern for detecting a film distortion amount between time t and t−1 is equal to (0, 0) (i.e., $(\Delta X_t, \Delta Y_t)=(0, 0)$). Properly putting the finger on the fingerprint reading face by the correlation object makes movement of the finger stable so that the value $(\Delta X_t, \Delta Y_t)$ returns to 0. This step judges that the instant at which the value $(\Delta X_t, \Delta Y_t)$ returns to 0 is the state in which the finger of the object is properly put. Positive result of the judgment means that the correlation object properly puts the finger, and the procedural steps proceed to step S023. On the other hand, if the result of the judgment is negative, the procedural steps return to step S018.

In step S023, the fingerprint distortion detection unit 9 notifies the controller 3 of timer stop, and terminates the procedural steps.

Figure 10:
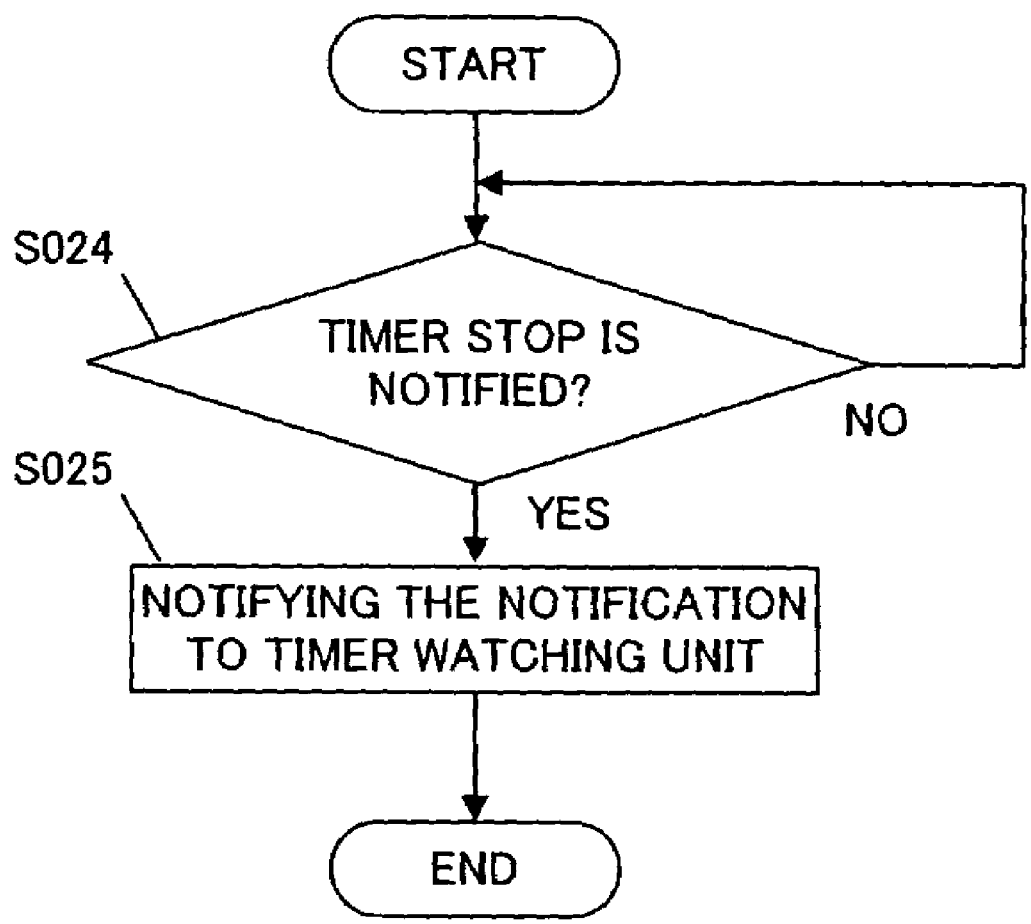
FIG. 10 is a flow diagram showing a succession of procedural steps performed by the controller.

A succession of procedural steps performed by the controller 3 will now be described with reference to FIG. 10.

In step S024, the controller 3 judges whether or not the fingerprint distortion detection unit 9 has notified the controller 3 of timer stop. Positive result of the judgment means that the fingerprint distortion detection unit 9 has received the notification, and the procedural steps proceed to step S025. On the other hand, negative result of the judgment causes the procedural steps to return to step S024.

In step S025, the controller 3 notifies the timer watching unit 1 that the fingerprint distortion detection unit 9 has issued notification of timer stop.

Figure 11:
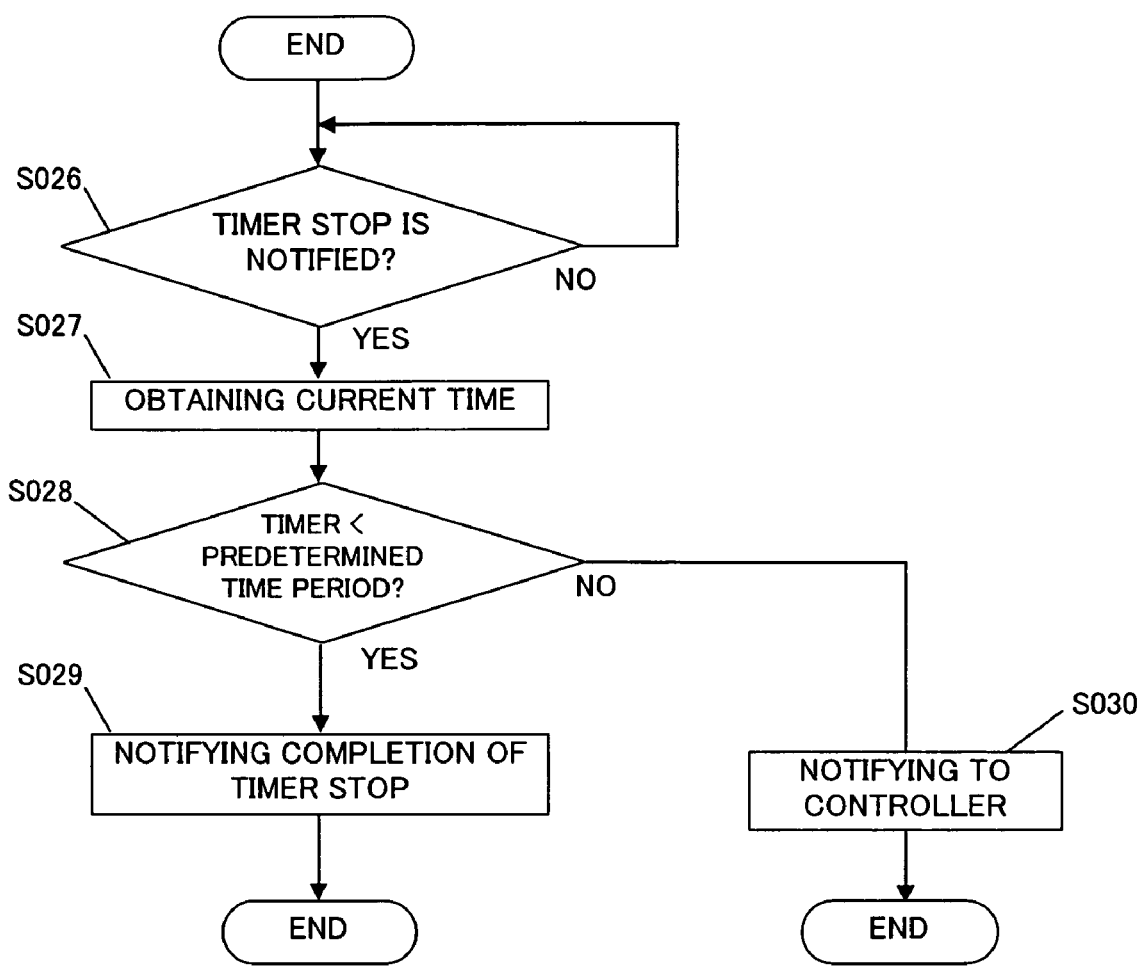
FIG. 11 is a flow diagram showing a succession of procedural steps performed by the timer watching unit.

A succession of procedural steps performed by the timer watching unit 1 will now be described with reference to FIG. 11.

In step S026, the timer watching unit 1 judges that the controller 3 has sent notification to the timer watching unit 1. Positive result of the judgment means that the timer watching unit 1 has received the notification, and the procedural steps proceed to step S027. On the other hand, if the result of the judgment is negative, the procedural steps return to step S026.

In step S027, the timer watching unit 1 obtains the current time, and proceeds the procedural steps to step S028.

In step S028, the timer watching unit 1 judges, based on the times obtained in steps S013 and S027, whether or not the correlation object stably fixes the finger in a predetermined time period. Positive result of the judgment means that the correlation object stably fixes the finer in the predetermined time period, and the procedural steps proceed to step S029. Conversely, if the result of the judgment is negative, the procedural steps move to step S030.

The timer watching unit 1 notifies the controller 3 of timer stop in step S029, and terminates the procedural steps.

In step S030, the timer watching unit 1 notifies the controller 3 that the correlation object has not properly put the finger in the predetermined time length to terminate the procedural steps.

Figure 12:
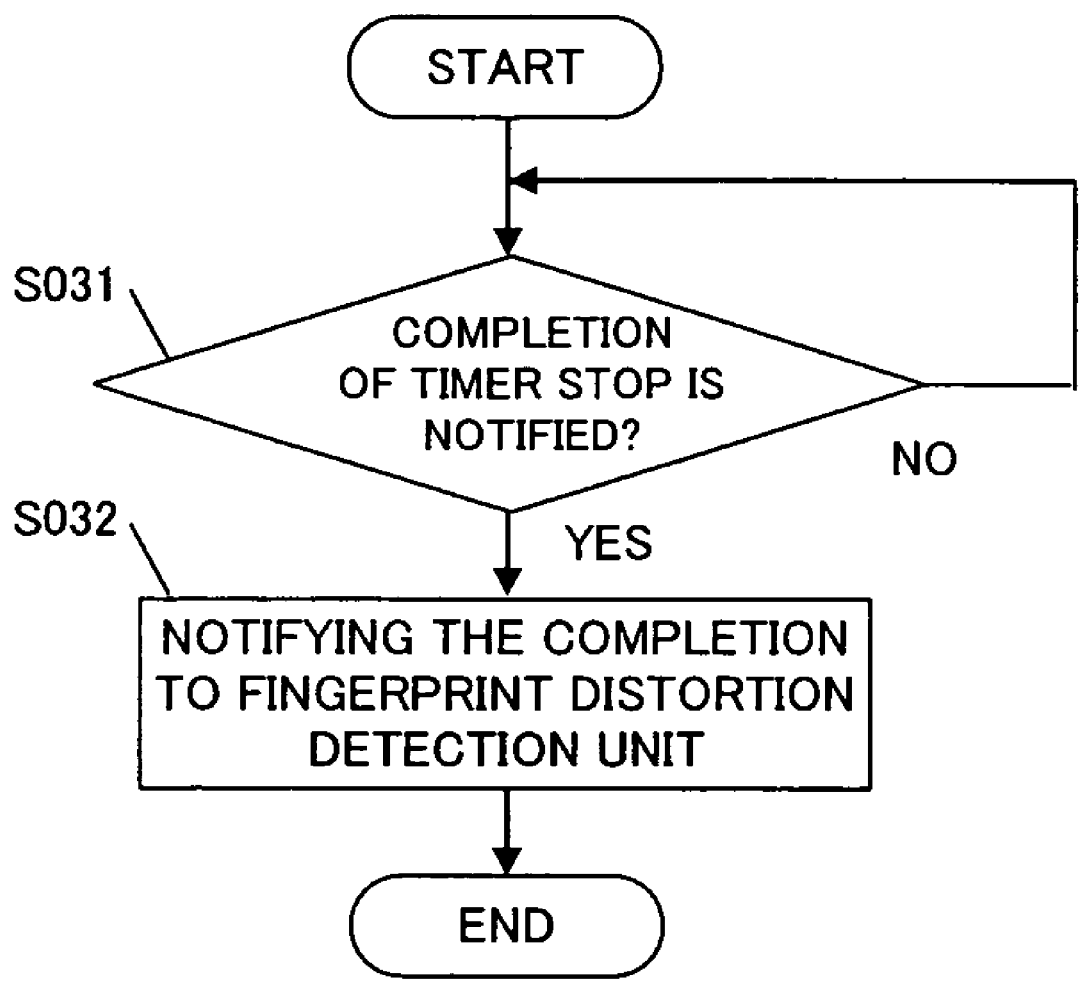
FIG. 12 is a flow diagram showing a succession of procedural steps performed by the controller.

A succession of procedural steps performed by the controller 3 will now be described with reference to FIG. 12.

In step S031, the controller 3 judges whether or not the timer watching unit 1 has notified the controller 3 of completion of timer stop. Positive result of the judgment means that the controller 3 has received the notification and the procedural steps proceed to step S032. On the other hand, if the result of the judgment is negative, the procedural step returns to step S031.

In step S032, the controller 3 notifies the fingerprint distortion detection unit 9 of completion of timer stop, and terminates the procedural steps.

Figure 13:
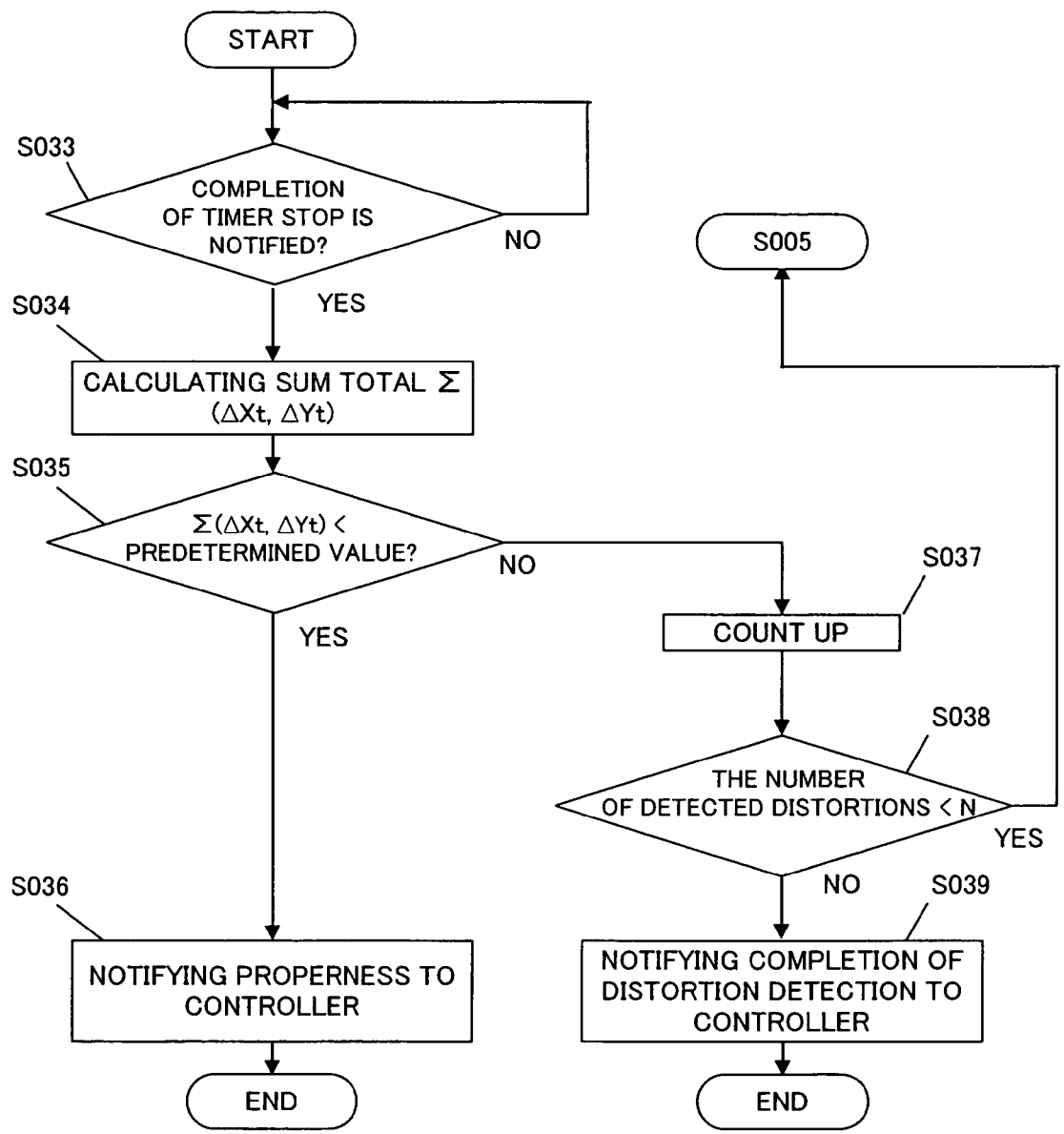
FIG. 13 is a flow diagram showing a succession of procedural steps performed by the fingerprint distortion detection unit.

A succession of procedural steps performed by the fingerprint distortion detection unit 9 will now be described with reference to FIG. 13.

In step S033, the fingerprint distortion detection unit 9 judges whether or not the controller 3 has notified the fingerprint distortion detection unit 9 of completion of timer stop. Positive result of the judgment means the fingerprint distortion detection unit 9 has received the notification, and the procedural steps moves to step S034. Conversely, negative result of the judgment returns the procedural steps to step S033.

Figure 9:
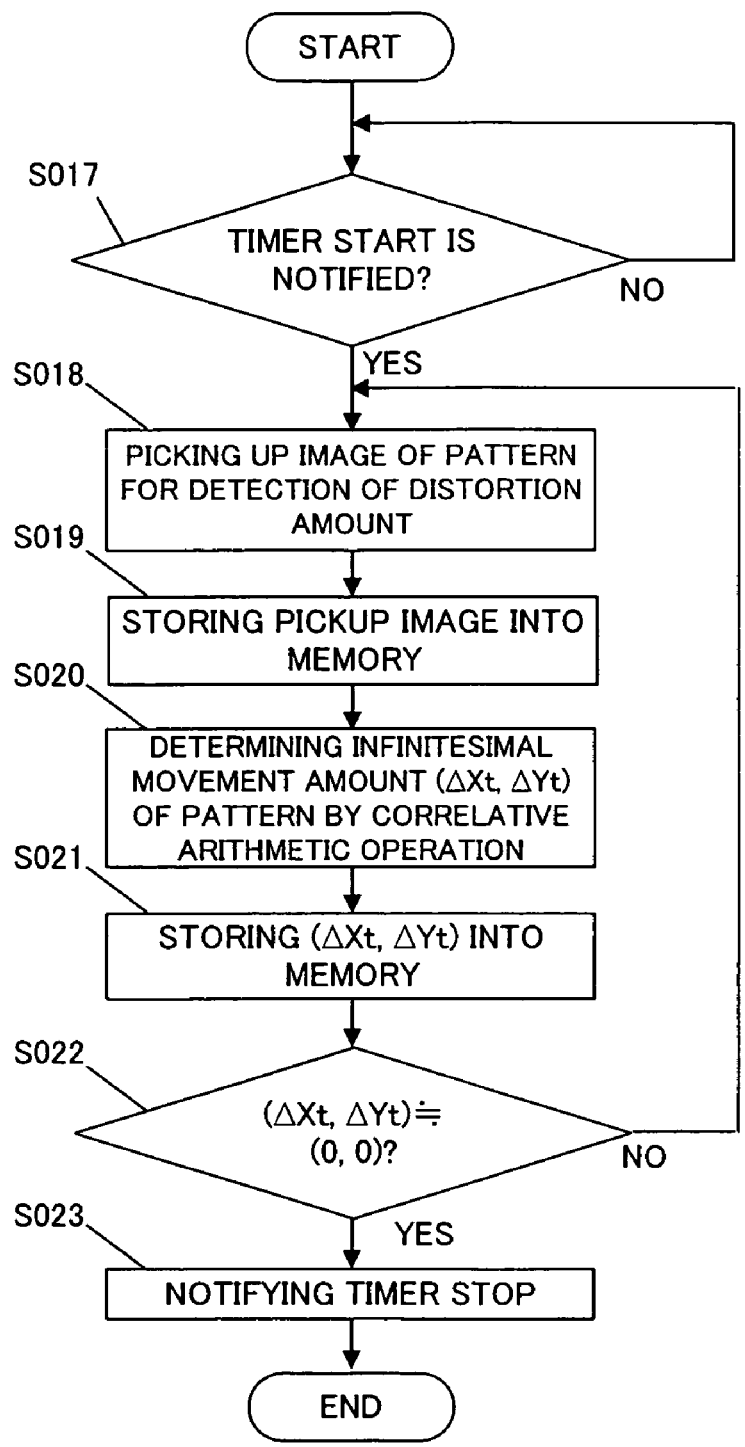
FIG. 9 is a flow diagram showing a succession of procedural steps performed by a fingerprint retrieval unit.

In step S034, the arithmetic operator 14 calculates the sum total of the infinitesimal movement amounts ($\Delta X_t$, $\Delta Y_t$) of a pattern for detecting a film distortion amount that have been stored in a procedural loop from step S018 to step S022 in FIG. 9, and proceeds the procedural steps to step S035.

In step S035, the arithmetic operator 14 judges whether or not the sum total of the infinitesimal movement amounts ($\Delta X_t$, $\Delta Y_t$) of a pattern for detecting a film distortion amount from putting of the finger on the fingerprint reading face to stably fixing the face is equal to or smaller than a predetermined value. In other words, whether or not the sum total of the infinitesimal movement amounts ($\Delta X_t$, $\Delta Y_t$) of a pattern for detecting a film distortion amount that have been stored in a procedural loop from step S018 to step S022 in FIG. 9 is equal to or smaller than a predetermined amount. If the correlation object improperly put the finger by, for example, rolling the finger, the sum total of movement amounts becomes larger in accordance with largeness of improperness in putting the finger. For this reason, a predetermined value is determined and a sum total in excess of the predetermined value is judged that the correlation object improperly puts the finger before stably fixing the finger. If the result of the judgment is positive, the finger is judged to be properly put, and the procedural steps proceed to step S036. On the other hand, if the result of the judgment is negative, the procedural steps moves to step S037.

The fingerprint distortion detection unit 9 notifies the controller 3 of completion of detection of fingerprint distortion in step S036 to terminate the procedural steps.

In step S037, the fingerprint distortion detection unit 9 increases the number of times that the fingerprint is judged to be distorted by one and the increased number is stored. Then the procedural steps proceeds to step S038.

In step S038, the fingerprint distortion detection unit 9 judges whether or not the number of times that the correlation object is judged to intentionally distort the fingerprint is equal to or smaller than a predetermined number (in the present embodiment, three times). If the result of the judgment is positive, the number of times of judgment of intentionally distortion of the fingerprints is equal to or smaller than the predetermined number and the procedural steps return to step S005 in FIG. 5. On the other hand, if the result of the judgment is negative, the procedural step proceeds to step S039. The reason why such a predetermined number of times that the correlation object is judged to intentionally distort the fingerprint is allowed is because the object does not get used putting the finger on the fingerprint reading face and may apply excessively large force to the finger if the object uses the fingerprint matching apparatus for the first time. Therefore, if the number of times that the fingerprint is judged to be intentionally distorted is equal to or smaller than the predetermined number, the fingerprint distortion detection unit 9 notifies the correlation object of application excessive large force to the finger. Upon receipt of this notification, the object can re-put the finger on the fingerprint reading face if necessary. Conversely, if the number of times that the fingerprint is judged to be intentionally distorted exceeds the predetermined number despite such a notification, the fingerprint distortion detection unit 9 judges that the correlation object distorts the fingerprint on purpose.

In step S039, the fingerprint distortion detection unit 9 notifies the controller 3 of completion of detection of fingerprint distortion, and terminates the procedural steps.

Figure 14:
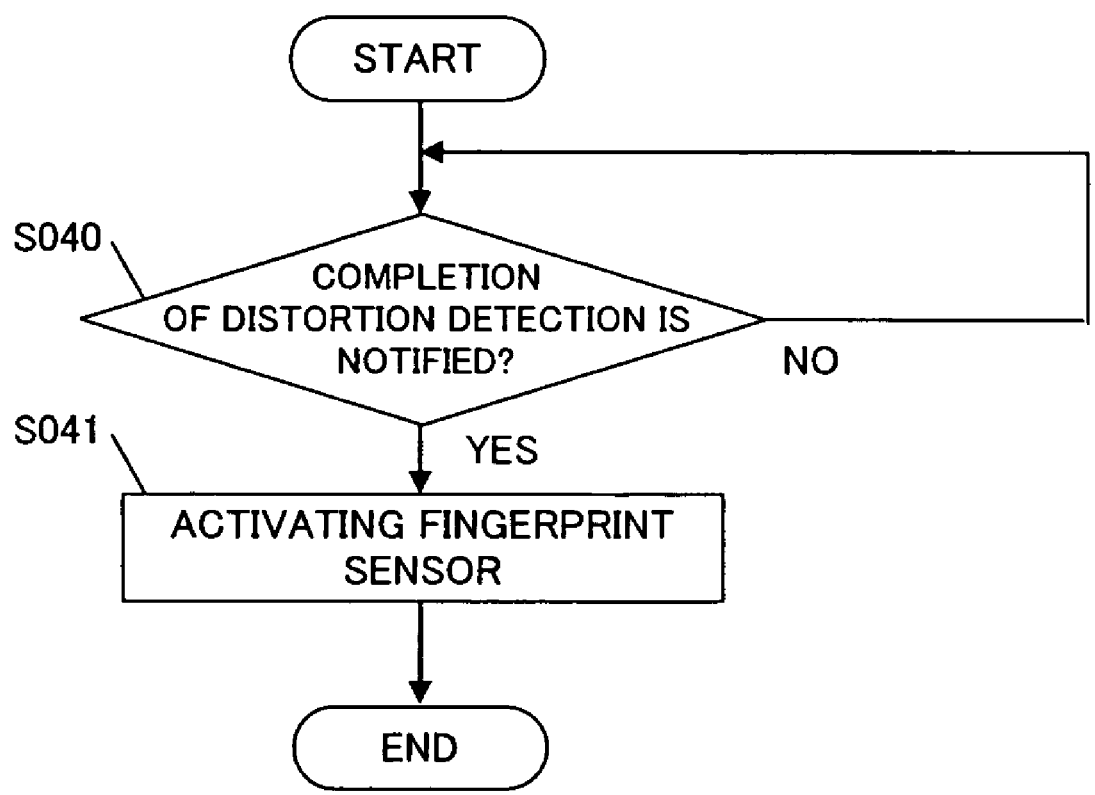
FIG. 14 is a flow diagram showing a succession of procedural steps performed by the controller.

A succession of procedural steps performed by the controller 3 will now be described with reference to FIG. 14.

In step S040, the controller 3 judges whether or not the fingerprint distortion detection unit 9 has notified the controller 3 of completion of fingerprint distortion detection. Positive result of the judgment means that the controller 3 has received the notification of completion of fingerprint distortion detection, and the procedural steps proceed to step S041. On the other hand, if the result of the judgment is negative, the procedural steps return to step S040.

In step S041, the controller 3 activates the fingerprint sensor 8, and terminates the procedural steps.

Figure 15:
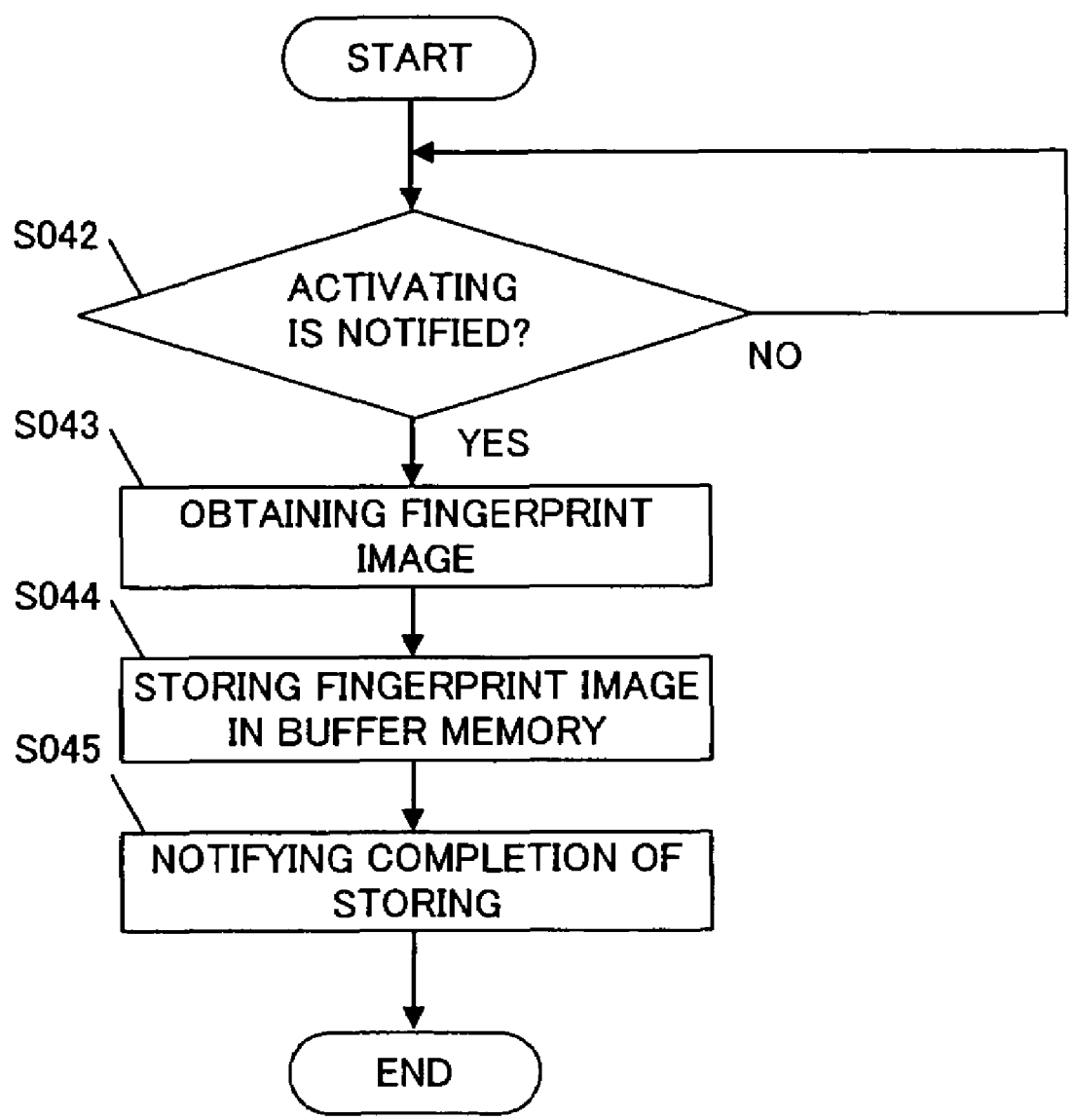
FIG. 15 is a flow diagram showing a succession of procedural steps performed by a fingerprint sensor.

A succession of procedural steps performed by the fingerprint sensor 8 will now be described with reference to FIG. 15.

In step S042, the fingerprint sensor 8 judges whether or not the controller 3 has notified the fingerprint sensor 8 of activation. Positive result of the judgment means that the fingerprint distortion detection unit 9 has received the notification of activation, and the procedural steps proceed to step S043. On the other hand, if the result of the judgment is negative, the procedural steps return to step S042.

The fingerprint sensor 8 obtains a fingerprint image in step S043, and proceeds the procedural steps to step S044.

The fingerprint sensor 8 stores the obtained fingerprint image into the fingerprint image buffer memory 7 in step S044, and proceeds the procedural steps to step S045.

In step S045, the fingerprint sensor 8 notifies the controller 3 of completion of storing the fingerprint image into the buffer memory to terminate the procedural steps.

Figure 16:
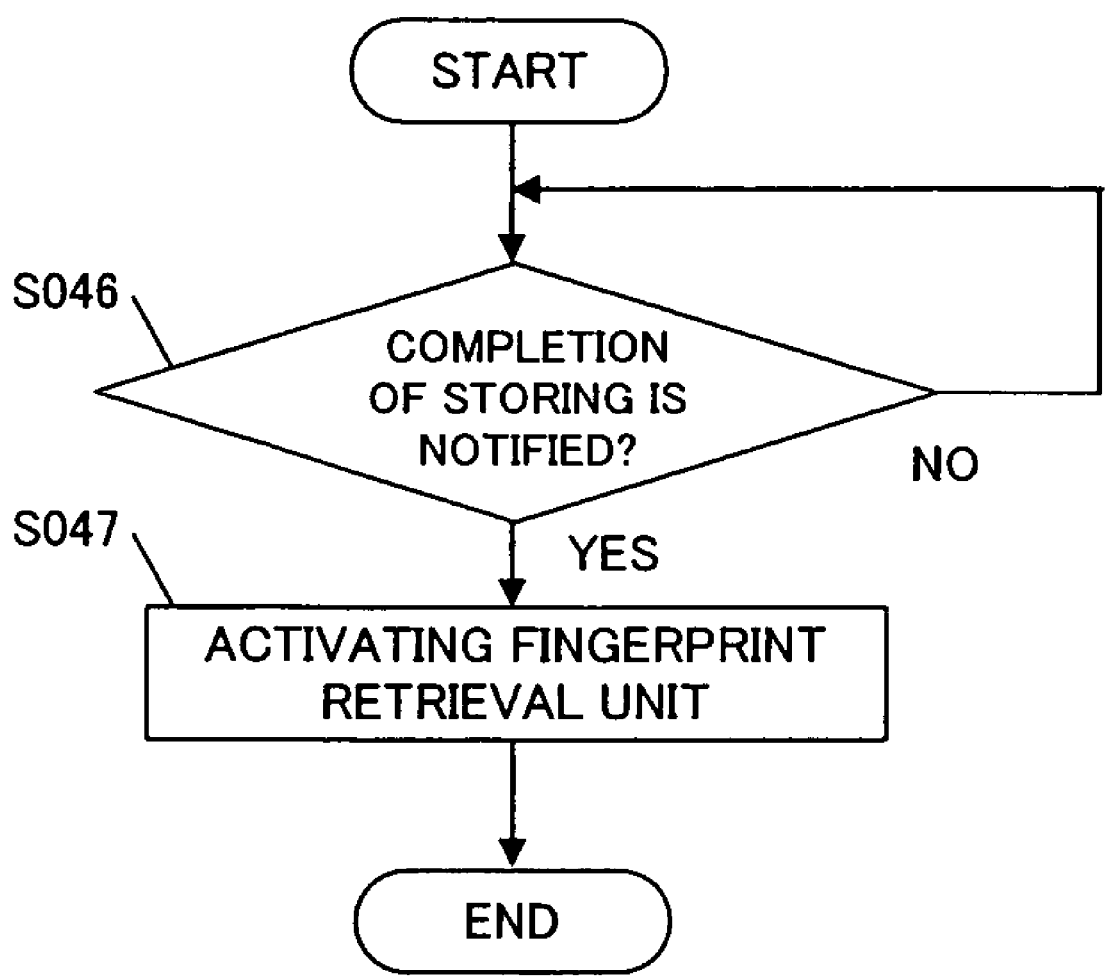
FIG. 16 is a flow diagram showing a succession of procedural steps performed by the controller.

A succession of procedural steps performed by the controller 3 will now be described with reference to FIG. 16.

In step S046, the controller 3 judges whether or not the fingerprint sensor 8 has sent a notification that storing of the fingerprint image has been completed to the controller 3. Positive result of the judgment means that the controller 3 has received the completion notification, and the procedural steps therefore proceed to step S047. On the other hand, if the result of the judgment is negative, the procedural steps return to step S046.

In step S047, the controller 3 activates the fingerprint retrieval unit 4, and terminates the procedural steps.

Figure 17:
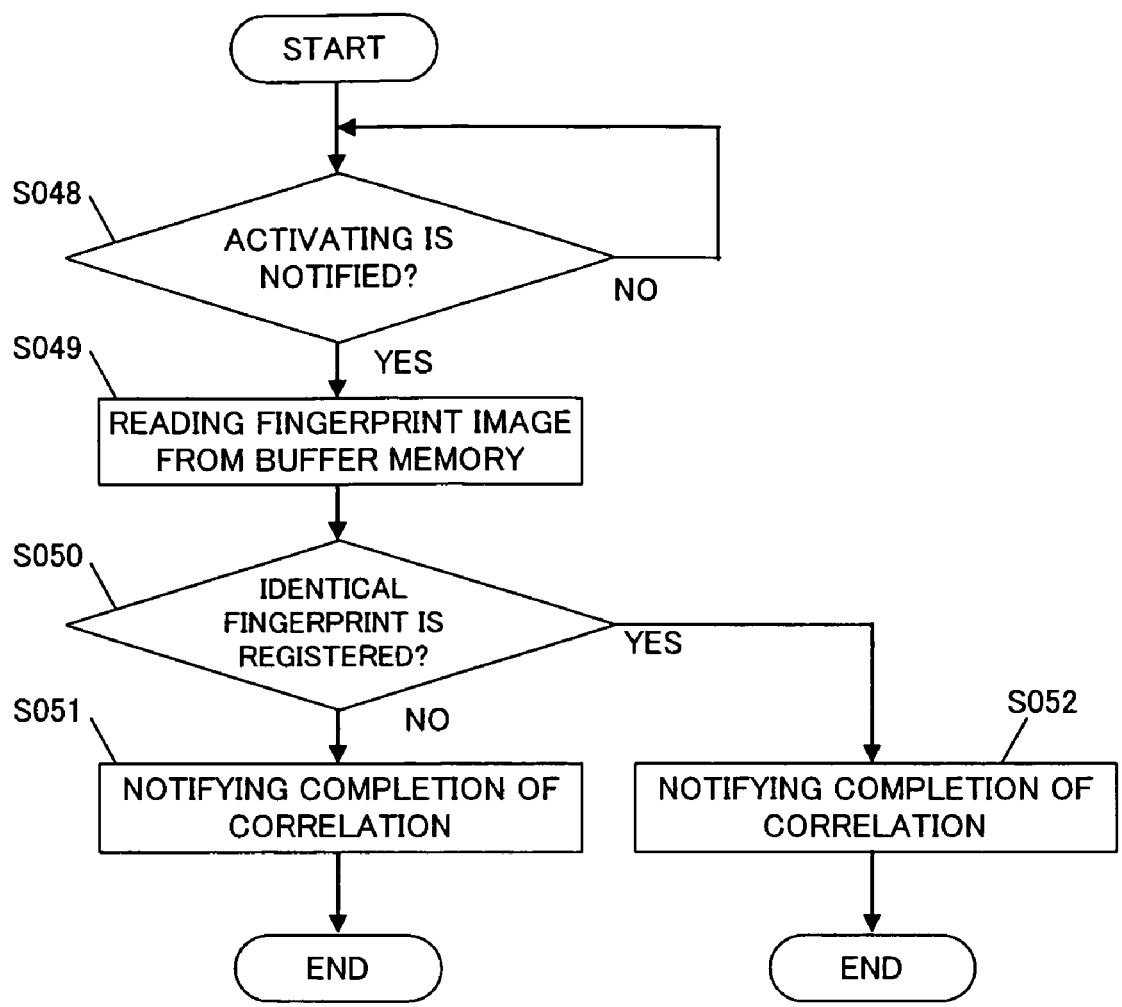
FIG. 17 is a flow diagram showing a succession of procedural steps performed by the finger print retrieval unit.

A succession of procedurals steps performed by the fingerprint retrieval unit 4 will now be described with reference to FIG. 17.

In step S048, the fingerprint retrieval unit 4 judges whether or not the controller 3 has notified the fingerprint retrieval unit 4 of activation. Positive result of the judgment means that the fingerprint retrieval unit 4 has received the activation notification, and the succession of procedural steps proceed to step S049. Conversely, if the result of the judgment is negative, the procedural steps return to step S048.

In step S049, the fingerprint retrieval unit 4 obtains the fingerprint image of the correlation object from the fingerprint image buffer memory 7, and moves to step S050.

In step S050, the fingerprint retrieval unit 4 judges whether or not the fingerprint image of the correlation object obtained in the previous step S049 is identical to each fingerprint image previously stored in the blacklist fingerprint image DB 6. If the blacklist fingerprint image DB 6 retains a fingerprint image identical to that of the correlation object, the correlation object is judged to be a person on a blacklist, and the procedural steps moves to step S052. On the other hand, if the result of the judgment is negative, the procedural steps proceed to step S051.

Instep S051, the fingerprint retrieval unit 4 notifies the controller 3 of completion of fingerprint correlation (that no identical fingerprint image is registered in the DB6) to terminate the procedural steps.

In step S052, the fingerprint retrieval unit 4 notifies the controller 3 of completion of fingerprint correlation (that an identical fingerprint image is registered in the DB6) to terminate the procedural steps.

Figure 18:
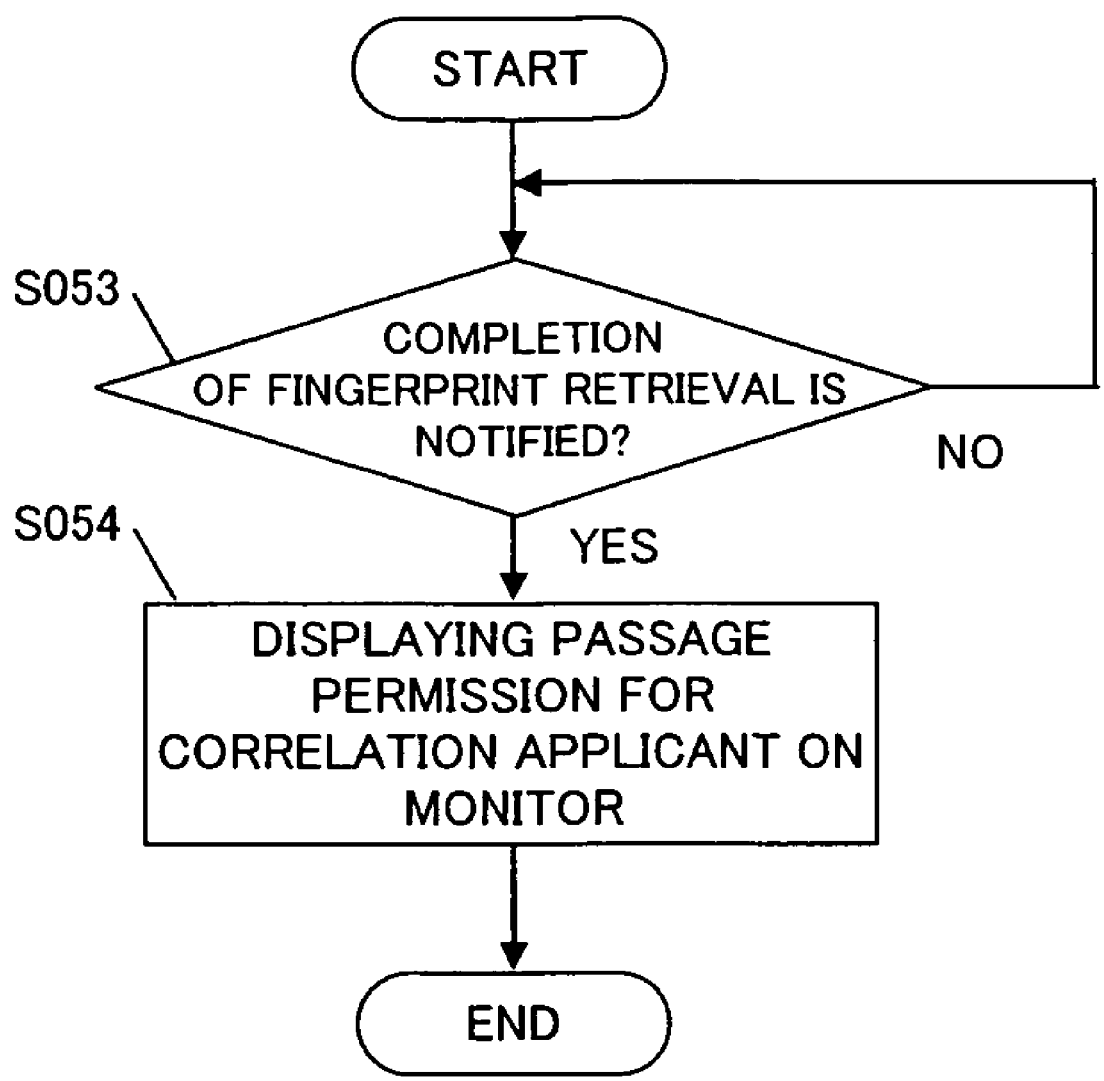
FIG. 18 is a flow diagram showing a succession of procedural steps performed by the controller.

A succession of procedural steps performed by the controller 3 will now be described with reference to FIG. 18.

In step S053, the controller 3 judges whether or not the controller 3 has received completion of fingerprint correlation (that no identical fingerprint image is registered in the DB6). Positive result of the judgment means that the controller 3 has received the notification, and the procedural steps proceed to step S054. On the other hand, if the result of the judgment is negative, the procedural steps return to step S053.

In step S054, the controller 3 displays a passage permission for the correlation object on the monitor 10, and terminates the procedural steps.

Figure 19:
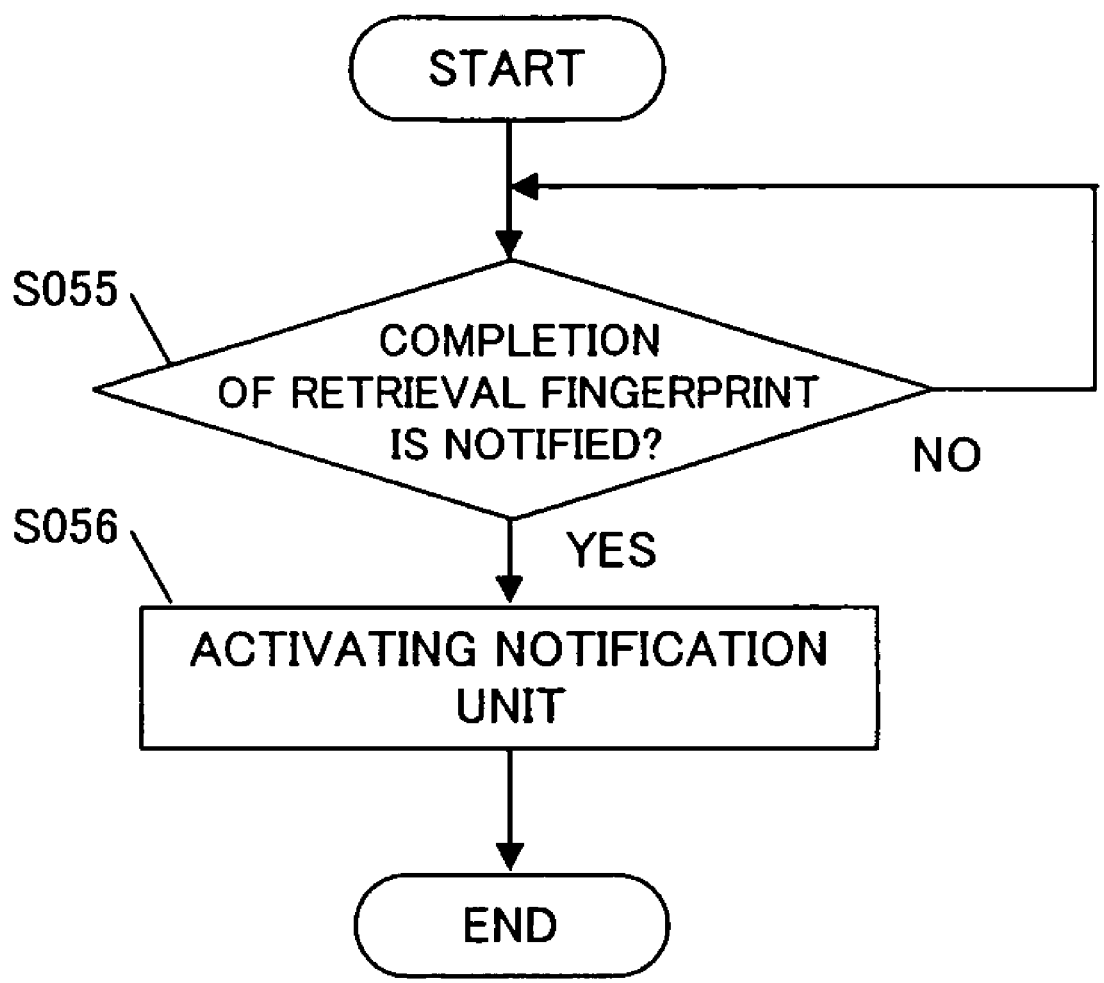
FIG. 19 is a flow diagram showing a succession of procedural steps performed by the controller.

A succession of procedural steps performed by the controller 3 will now be described with reference to FIG. 19.

In step S055, the controller 3 judges whether or not the controller 3 has received completion of fingerprint correlation (that an identical fingerprint image is registered in the DB6) or whether or not the fingerprint distortion detection unit 9 has notified the controller 3 that the number of times that the correlation object is judged to distort the fingerprint is equal to or larger than the predetermined number. If the result of either judgment is positive, the controller 3 has received the notification of completion of fingerprint correlation or the notification of intentionally distorting of fingerprint by the correlation object, and the procedural steps proceed to step S056. On the other hand, if the result of the judgment is negative, the procedural steps return to step S055.

In step S056, the controller 3 activates the notification unit 5 and terminates the procedural steps.

Figure 20:
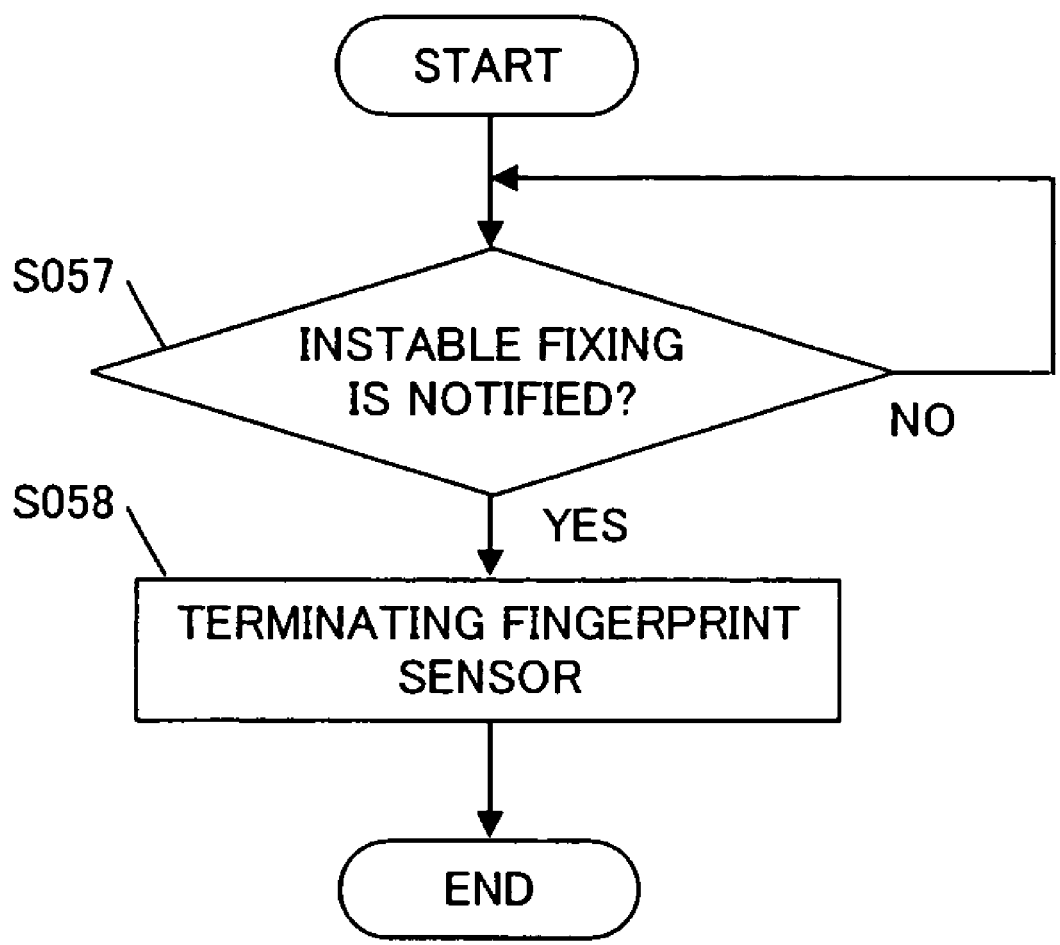
FIG. 20 is a flow diagram showing a succession of procedural steps performed by the controller.

A succession of procedural steps performed by the controller 3 will now be described with reference to FIG. 20.

In step S056, the controller 3 judges whether or not the fingerprint distortion detection unit 9 has notified the controller 3 that the correlation object has not stably fixed the finger in the predetermined time period. Positive result of the judgment means that the controller 3 has received the notification, and the procedural steps proceed to step S058. On the other hand, if the result of the judgment is negative, the procedural steps return to step S057.

In step S058, the controller 3 quits the fingerprint sensor 8. As a consequence of the quitting of the fingerprint sensor 8, the correlation object cannot make the fingerprint sensor 8 read the fingerprint image. Then the procedural steps is terminated.

Figure 21:
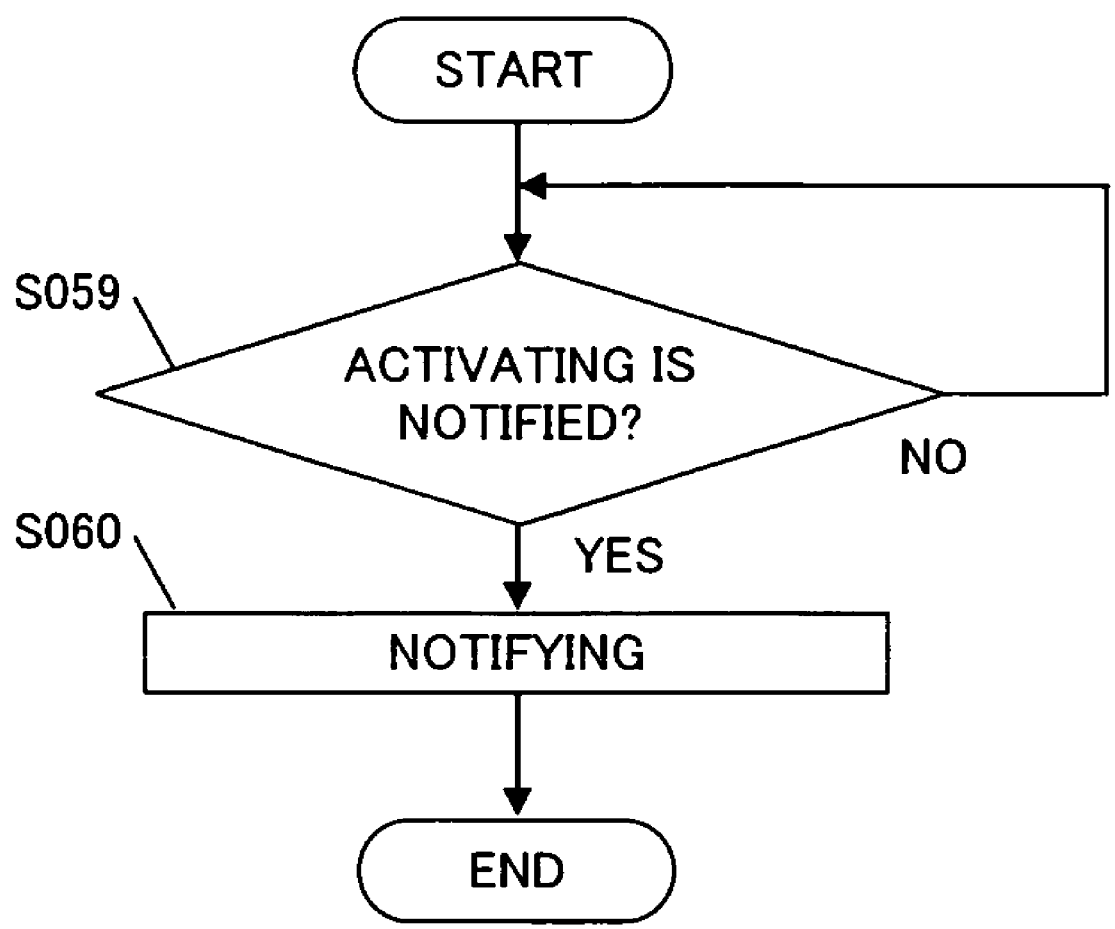
FIG. 21 is a flow diagram showing a succession of procedural steps performed by a notification unit.

A succession of procedural steps performed by the notification unit 5 will now be described with reference to FIG. 21.

In step S059, the notification unit 5 judges whether or not the controller 3 has notified the notification unit 5 of activation. Positive result of the judgment means that the notification unit 5 has received the activation notification, and the procedural steps proceed to step S060. On the other hand, if the result of the judgment is negative, the procedural steps return to step S059.

In step S060, the notification unit 5 notifies a staff clerk that the fingerprint image cannot obtain because the correlation object has intentionally distorted the fingerprint or that the fingerprint of the correlation object is identical to one of the fingerprint images registered in the blacklist fingerprint image DB 6, and then terminates the procedural steps.

(B) Second Embodiment

The fingerprint distortion detection unit 9 may be detailed to have an alternative configuration. A fingerprint distortion detection unit used in the present second embodiment is described with reference to FIGS. 27 and 28, which shows the side view and the top view of the fingerprint distortion detection unit, respectively.

A correlation object do the same thing as exemplified in the first embodiment to distort the fingerprint. The theory to detection intentional distortion of a fingerprint is identical to that described in the first embodiment.

Figure 28:
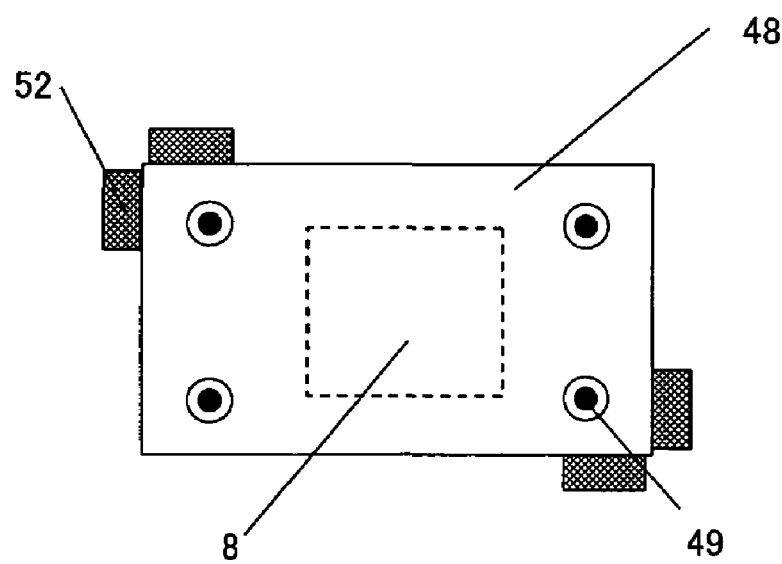
FIG. 28 is an appearance diagram illustrating the top view of the fingerprint distortion detection unit (based on a glass-board pressure)

As shown in FIG. 28, the four corners of a glass board 48 are semi-fixed by glass board fixing feet 49. To "semi-fix" means that the glass board 48 is fixed so as to slightly move in the horizontal direction. Restriction by the fingerprint reading face makes it impossible for the glass board 48 to move in the vertical direction. i (natural number) pressure detection units 52 are installed around the glass board 48. Each pressure detection unit 52 includes a pressure sensor 16, a memory 17, an arithmetic operator 18, and a controller 19, as shown in FIG. 2(*b*). The pressure sensor 16 measures a pressure applied by the glass board 48, and stores the measured pressure into the memory 17. The arithmetic operator 18 carries out various arithmetic operations, such as difference calculation, on pressure values stored in the memory 17. These operations are carried out under control of the controller 19.

Figure 27:
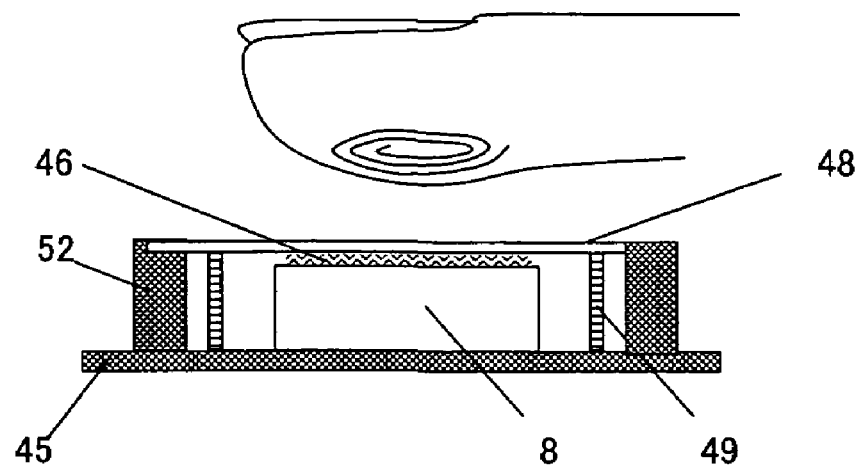
FIG. 27 is an appearance diagram illustrating the side view of a fingerprint distortion detection unit (based on a glass-board pressure) according to an embodiment of the present invention.

As shown in FIG. 27, the glass board 48 is not in intimate contact with the fingerprint reading face but is semi-fixed by the glass board fixing feet 49 so as to form a space between the film and the fingerprint reading face. The space is created in order to allow the glass board 48 to slightly move when a correlation object puts a finger on the glass board 48. However, the space between the film and the fingerprint reading face causes irregular reflection of light rays and a mismatch of the refractive index to make it impossible to obtain a clear fingerprint image. As a solution, the space is filled with a refractive index adjusting agent 46 to inhibit irregular reflection of light passed through the glass board 48 on uneven surfaces of the transparent film 41 or the fingerprint reading face, so that a clear fingerprint image can be obtained.

When a correlation object puts the finger on the fingerprint reading face, the glass board 48 slightly moves because of the presence of the space between the board 41 and the face. The movement of the glass board 48 varies a pressure value detected by each pressure sensor 16. With reference to the variation in the pressure values, whether or not the correlation object properly puts the finger is judged. Specifically, if the object properly puts the finger on the face, the pressure sensors 16 detect similar pressure values. Conversely, if the collation object distorts the fingerprint on purpose by dragging or rolling, a large pressure in a particular direction is applied to the glass board 48 and the pressure sensors 16 detect respectively different pressure values. Accordingly, it is possible to judge whether or not the correlation object properly puts the finger on the fingerprint reading face by comparing pressure values detected by the pressure sensors 16 attached to the glass board 48.

Figure 22:
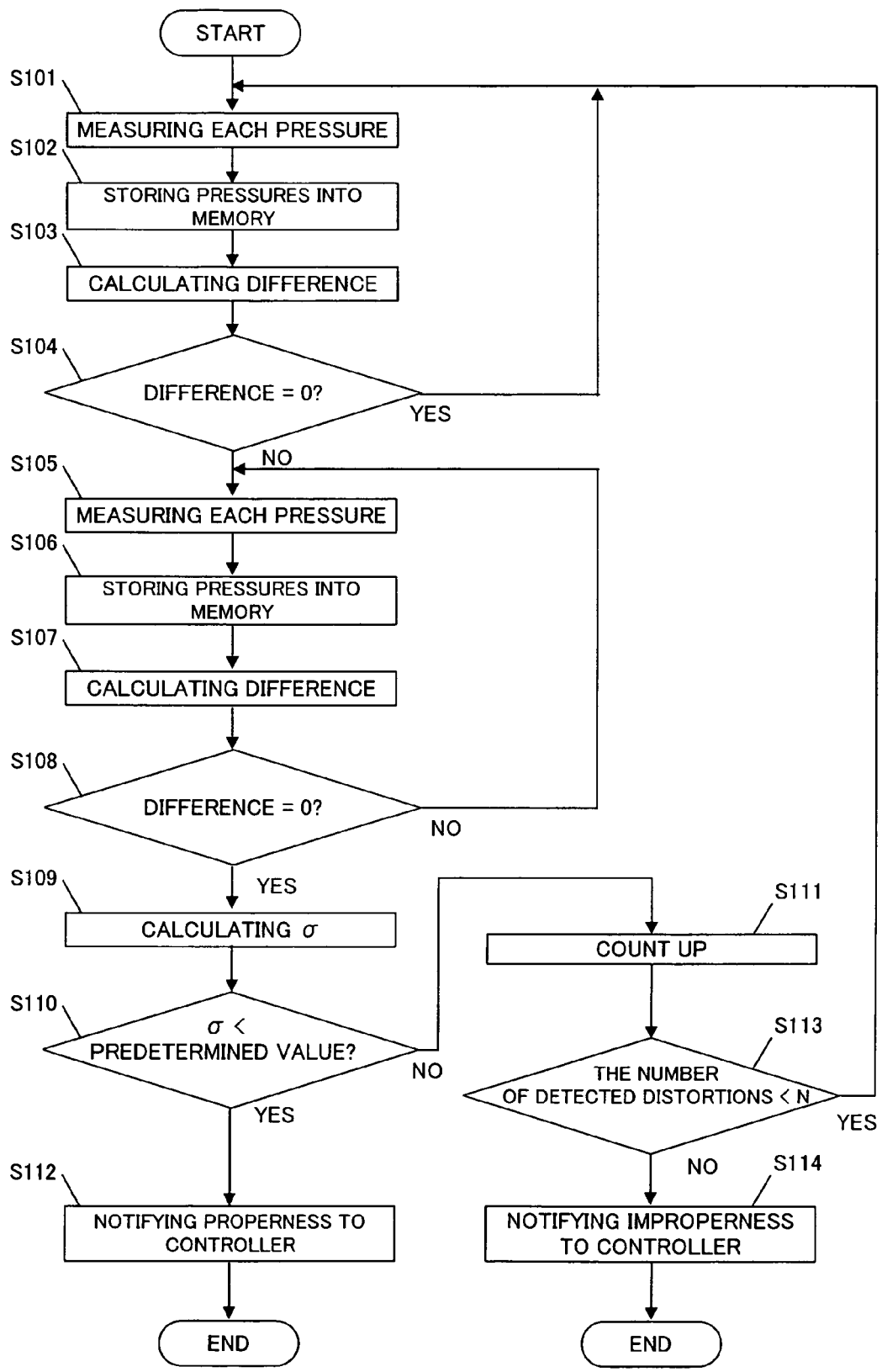
FIG. 22 is a flow diagram showing a succession of procedural steps performed by the pressure detection unit.

A succession of procedural steps performed to detect that a correlation object improperly put the finger will now be described with reference to FIG. 22.

In step S101, each pressure sensor 16 measures the pressure $P_{i,t}$ applied to the sensor. Here, i represents the number of the sensor and t represents time. The procedural steps proceed to step S102.

In step S102, the controller 19 stores pressures $P_{i,t}$ measured by the pressure sensors 16 in step S101 into the memory 17, and moves to step S103.

In step S103, the arithmetic operator 18 calculates a difference between $P_{i,t}$ and $P_{i,t-1}$ continually measured at times t and t−1 respectively by each pressure sensor 16, and the procedural steps proceed to step S104.

In step S104, the arithmetic operator 18 judges whether or not the difference calculated in step S103 is 0 (zero) Putting a finger on the fingerprint reading face by the correlation object slightly moves the glass board to change pressure valued measured by each pressure sensor 16. The instant at which pressure values vary is considered as the state in which the correlation object puts the finger. If the result of the judgment is positive, the correlation object has put the finger on the fingerprint reading face, and the procedural steps proceed step S105. On the other hand, if the result of the judgment is negative, the procedural steps return to step S101.

In step S105, each pressure sensor 16 measures the pressure $P_{i,t}$ applied to the sensor, and the procedural steps proceed to step S106.

In step S106, the controller 19 stores pressures $P_{i,t}$ measured by the pressure sensors 16 in step S101 into the memory 17.

In step S107, the arithmetic operator 18 calculates a difference between $P_{i,t}$ and $P_{i,t-1}$ continually measured at times t and t−1 respectively by each pressure sensor 16, and the procedural steps proceed to step S108.

In step S108, the arithmetic operator 18 judges whether or not the difference calculated in step S103 is 0 (zero). Since movement of the finger becomes stable if the correlation object properly puts the finger on the fingerprint reading face, the difference returns to 0. The instant at which the difference returns to 0 is judged to be a state in which the finger of the correlation object is stably put. If the result of the judgment is positive, the procedural steps proceed to step S109. On the other hand, the result of the judgment is negative, the procedural steps return to step S105.

In step S109, the arithmetic operator 18 calculates the variation σ of pressure values $P_{i,t}$ measured by the pressure sensors 16. The variation σ is calculated using the pressure values measured at the time when the finger is judged to be stably put because the variation σ shows a certain tendency when an excessively large force is applied to the finger to distort the fingerprint even if the finger is stably put. With reference to the value of the variation σ, it is possible to detect application of excessively large force to the finger even when the finger is stably put on the face. Alternatively, all the pressure values $P_{i,t}$ stored in a procedural loop from step S105 to step S108 may be used to calculate a variation σ. With reference to such a variation σ, it is possible to detect instant application of large force to the finger by the time when the finger is judged to be stably fixed on the fingerprint reading face. The procedural steps proceed to step S110.

In step S110, the arithmetic operator 18 judges whether or not the variation σ calculated in step S109 is equal to or smaller than a predetermined value. If the correlation object applies excessively large force to the finger to intentionally distort the fingerprint, the variation σ shows a certain tendency. If the result of judgment is positive, the correlation object properly puts the finger on the fingerprint reading face, and the procedural step proceed to step S112. On the other hand, if the result of the judgment is negative, the procedural steps moves to step S111.

In step S111, the fingerprint distortion detection unit 9 increases the number of times that the correlation object is judged to intentionally distort the fingerprint by one and stores the increased number. Then the procedural steps proceed to step S113.

In step S113, the fingerprint distortion detection unit 9 judges whether or not the number of times that the correlation object is judged to intentionally distort the fingerprint is equal to or smaller than a predetermined number (in the present embodiment, three times). If the result of the judgment is positive, the number that the correlation object is judged to intentionally distort the fingerprint is equal to or smaller than the predetermined number, and the procedural steps return to step S101. On the other hand, if the result of the judgment is negative, the procedural step moves to step S114. The reason why such a predetermined number of times that the correlation object is judged to intentionally distort the fingerprint is allowed is the same as that described in the first embodiment.

In step S112, the fingerprint distortion detection unit 9 notifies the controller 3 of the completion of fingerprint distortion detection (that the correlation object properly puts the finger) to terminate the procedural step.

In step S114, the fingerprint distortion detection unit 9 notifies the controller 3 of the completion of fingerprint distortion detection (that the correlation object improperly puts the finger) to terminate the procedural step.

Figure 23:
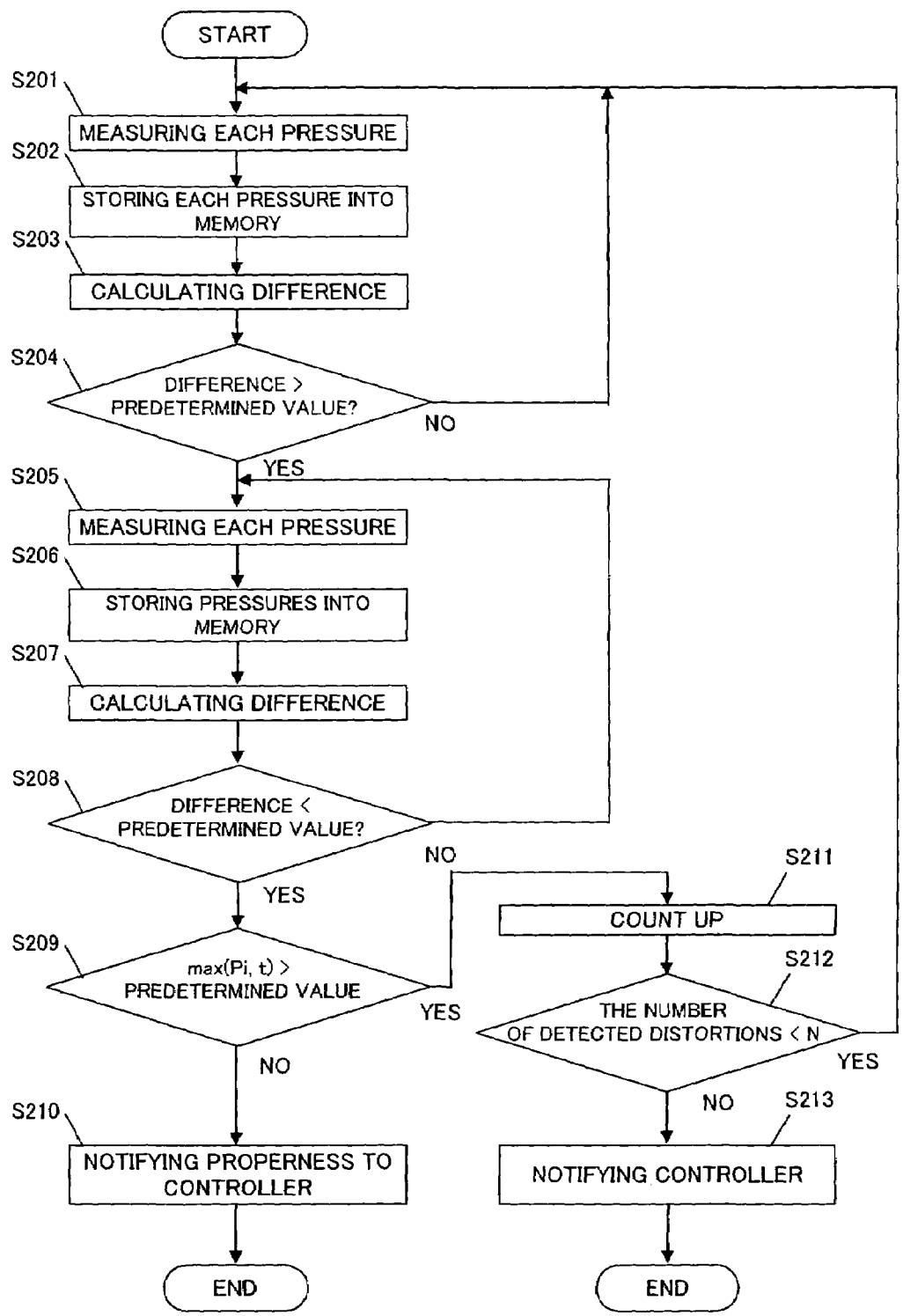
FIG. 23 is a flow diagram showing a succession of procedural steps performed by the pressure detection unit.

Alternatively, in step S109 of the present embodiment, the maximum pressure value may be extracted from pressure values stored during a procedural loop from step S105 to step S108, and whether or not the maximum pressure value is equal to or larger than a predetermined value may be judged in ensuing step S110. If the pressure value is excessively large, the correlation object is presumed to have improperly put the finger. A succession of procedural steps performed in this case will now be described with reference to FIG. 23.

(C) Third Embodiment

The fingerprint distortion detection unit 9 detailed in the third embodiment may be modified to have an alternative configuration.

A fingerprint distortion detection unit used in the present second embodiment is described with reference to FIGS. 29 and 30, which shows the side view and the top view of the fingerprint distortion detection unit, respectively.

Figure 30:
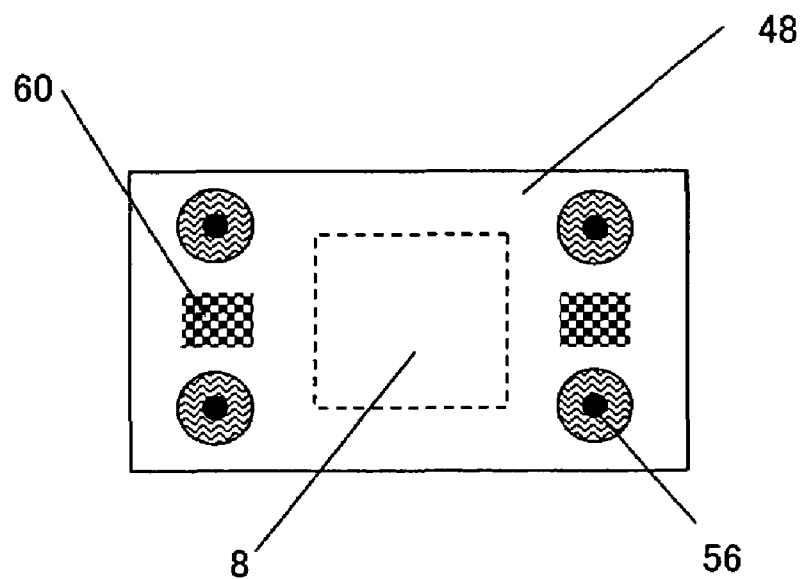
FIG. 30 is an appearance diagram illustrating the top view of the fingerprint distortion detection unit (based on a glass-board movement amount)

As shown in FIG. 30, the four corners of a glass board 48 are semi-fixed by elastic fixing feet 56. To "semi-fix" is the same as that described in the second embodiment. Patterns 60 for detecting a glass board movement amount in the form of check are partially printed on the glass board 48.

Figure 29:
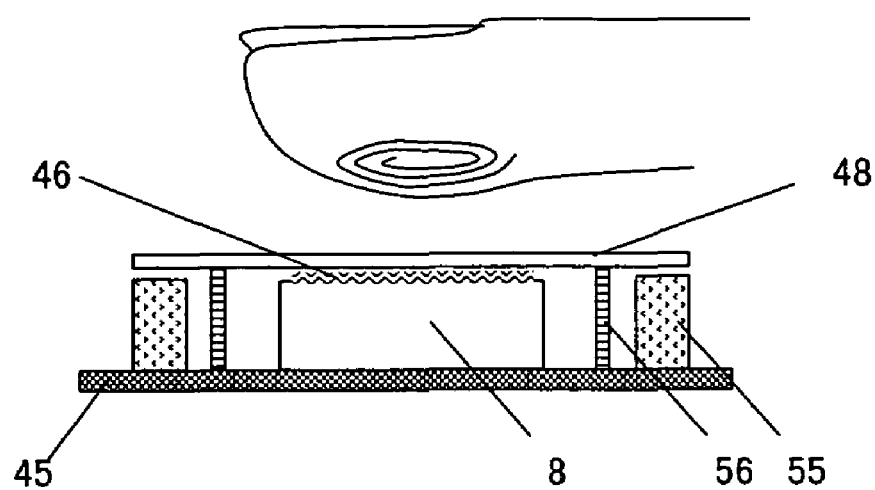
FIG. 29 is an appearance diagram illustrating the side view of a fingerprint distortion detection unit (based on a glass-board movement amount) according to an embodiment of the present invention.

As shown in FIG. 29, the glass board 48 is not in intimate contact with the fingerprint reading face but is fixed by the elastic fixing feet 56 so as to form a space between the film and the fingerprint reading face. The space is created in order to detect movement of the finger which movement accompanies movement of the glass board 48 when the correlation object put the finger on the glass board 48. However, the space between the glass board 48 and the fingerprint reading face causes irregular reflection of light rays and a mismatch of the refractive index to make it impossible to obtain a clear fingerprint image. As a solution, the space is filled with a refractive index adjusting agent 46 for the same reason as the second embodiment.

Glass-board movement amount detection units 55 are arranged beneath the patterns 60 for detecting a glass-board movement amount. Each glass-board movement amount detection unit 55 includes an optical lens unit 20, an image pickup element 21, a memory 22, an arithmetic operator 23, and a controller 24, as shown in FIG. 2(*c*). The image pickup element takes an image of the patterns 60 for detecting a glass-board movement amount through the optical lens unit 20 and stores the taken image into the memory 22. The arithmetic operator 23 carries out various arithmetic operations, such as a correlative arithmetic operation, on the image stored in the memory 22. These operations are carried out under control of the controller 24.

When a correlation object puts a finger on the fingerprint reading face, the glass board 48 slightly moves because the glass board 48 is in the state of being semi-fixed. Such slight movement is used for determination whether or not the correlation object properly puts the finger. If the correlation object properly puts the finger, the glass board 48 does not move much so that the patterns 60 for detecting a glass-board movement amount do not move much. Conversely, if the collation object distorts the fingerprint on purpose by dragging or rolling, a large pressure in a particular direction is applied to the fingertip. In this case, the glass board 48 moves much and the patterns 60 for detecting a glass-board movement amount accordingly move much. For example, if the correlation object drags the finger forward, the glass board 48 moves also forward and accordingly the patterns 60 for detecting a glass-board movement amount move forward.

The procedure for detecting improper putting of the finger by the correlation object is the same as those performed in the first embodiment.

(D) Fourth Embodiment

The fingerprint distortion detection unit 9 may be modified to have an alternative configuration. The fingerprint distortion detection units described in the first through the third embodiments have fingerprint sensors covered with transparent film and others, and therefore the fingerprint sensors should be optical sensors. Alternatively, the fourth embodiment can use a non-optical fingerprint sensor such as a semiconductor fingerprint sensor.

A fingerprint distortion detection unit of the present embodiment will now be described with reference to FIGS. 31 and 32, which are the side view and the bottom view of the fingerprint distortion detection unit, respectively.

Figure 32:
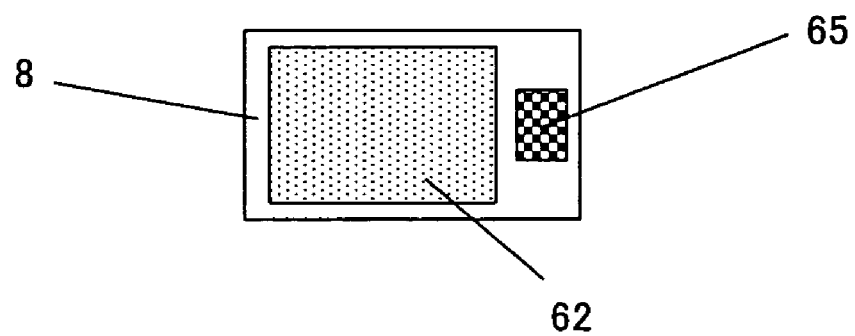
FIG. 32 is an appearance diagram illustrating the bottom view of the fingerprint distortion detection unit (based on a fingerprint-sensor movement amount)

As shown FIG. 32, a pattern 65 for detecting a fingerprint-sensor movement amount is partially printed on the fingerprint sensor 8.

Figure 31:
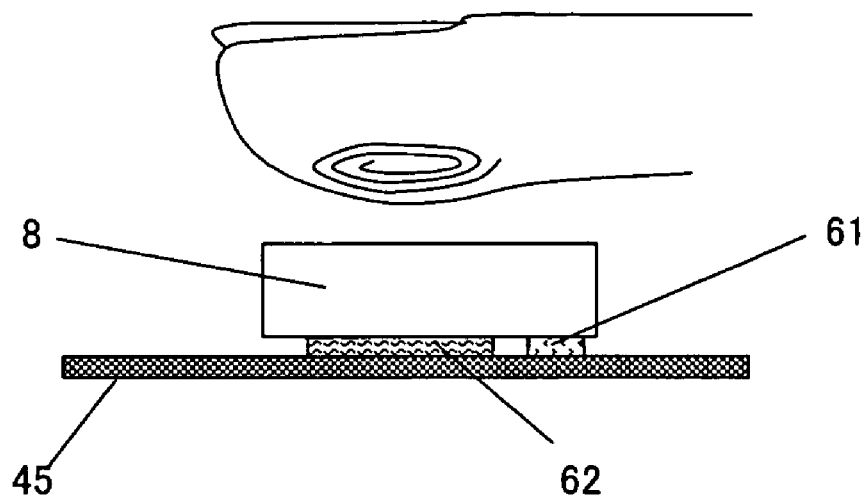
FIG. 31 is an appearance diagram illustrating the side view of a fingerprint distortion detection unit (based on a fingerprint-sensor movement amount) according to an embodiment of the present invention.

As shown in FIG. 31, the fingerprint sensor 8 is fixed on a mount 45 with being interposed by an elastic body 62. A fingerprint-sensor movement amount detection sensor 61 is arranged beneath the pattern 65 for detecting a fingerprint-sensor movement amount. The fingerprint-sensor movement amount detection sensor 61 is identical in configuration to the film distortion amount detection unit 43.

When a correlation object puts a finger on the fingerprint reading face, the fingerprint sensor 8 slightly moves because the fingerprint sensor 8 is fixed to the elastic body 62. Such slight movement is used for determination whether or not the correlation object properly puts the finger. If the correlation object properly puts the finger, the fingerprint sensor 8 does not move much so that the patterns 65 for detecting a finger-print-sensor movement amount do not move much. Conversely, if the collation object distorts the fingerprint on purpose by dragging or rolling, a large pressure in a particular direction is applied to the fingertip. In this case, the fingerprint sensor 8 moves much and the pattern 65 for detecting a fingerprint-sensor movement amount accordingly moves much. For example, if the correlation object drags the finger forward, the fingerprint sensor 8 moves also forward and accordingly the pattern 65 for detecting a fingerprint-sensor movement amount moves forward.

The procedural steps for detecting improper putting of the finger by the correlation object are the same as those performed in the first embodiment.

(E) Fifth Embodiment

The fingerprint distortion detection unit 9 of the first embodiment may be modified to have an alternative configuration. The fingerprint distortion detection units described in the first through the third embodiments have fingerprint sensors covered with transparent film and others and therefore the fingerprint sensors should be optical sensors. Alternatively, the fifth embodiment can use a non-optical fingerprint sensor such as a semiconductor fingerprint sensor.

A fingerprint distortion detection unit of the present embodiment will now be described with reference to FIGS. 33 and 34, which are the side view and the bottom view of the fingerprint distortion detection unit, respectively.

Figure 34:
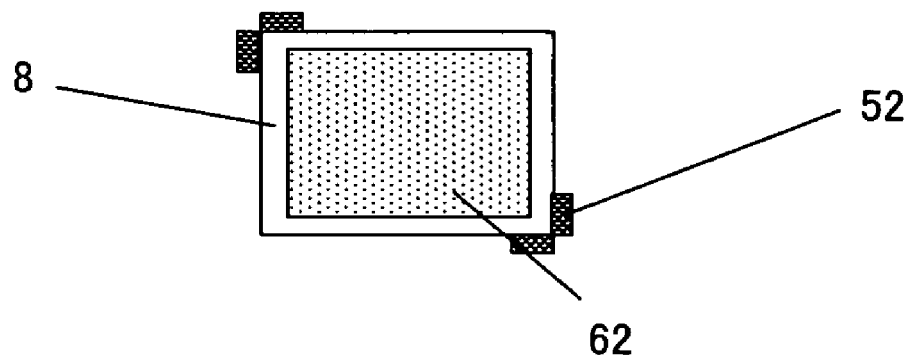
FIG. 34 is an appearance diagram illustrating the bottom view of the fingerprint distortion detection unit (based on a fingerprint-sensor pressure).

As shown in FIG. 34, a number of pressure detection units 52 are arranged around the fingerprint sensor 8. The configuration of each pressure detection unit 52 is identical to that described in the second embodiment.

Figure 33:
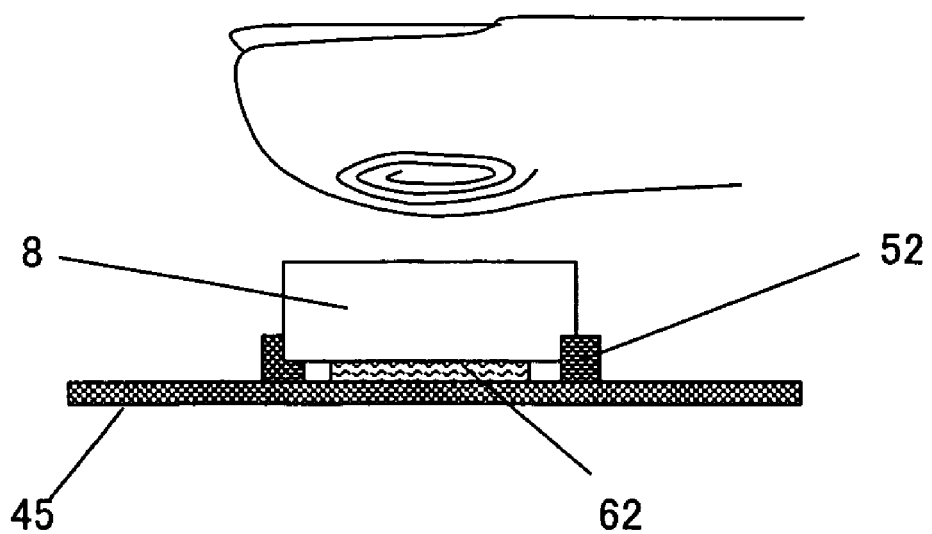
FIG. 33 is an appearance diagram illustrating the side view of a fingerprint distortion detection unit (based on a fingerprint-sensor pressure) according to an embodiment of the present invention.

As shown in FIG. 33, the fingerprint sensor 8 is fixed on a mount 45 with being interposed by an elastic body 62. When a correlation object puts a finger on the fingerprint reading face, the fingerprint sensor 8 slightly moves because the fingerprint sensor 8 is fixed to the elastic body 62. Such slight movement causes variation in pressure value detected by the pressure sensor 16 of each pressure detection unit 52. These pressure values are used for determination whether or not the correlation object properly puts the finger. In other words, when the correlation object properly puts the finger, pressure values detected by all the pressure sensors are roughly the same. Conversely, if the collation object distorts the fingerprint on purpose by dragging or rolling, the pressure sensors detect respective different pressure values. For this reason, it is possible to detect that the correlation object improperly puts the finger by comparing pressure values measured by the pressure detection units 52 installed to the fingerprint sensor 8.

The procedure for detecting improper putting of the finger by the correlation object is the same as those performed in the second embodiment.

Further, the present invention should by no means be limited to these foregoing embodiments, and various changes or modifications may be suggested without departing from the gist of the invention.

What is claimed is:

1. A fingerprint matching apparatus for reading a fingerprint image of a finger put on a fingerprint reading face of a fingerprint sensor and matching the fingerprint image with a fingerprint image that has been previously registered, the apparatus comprising:

a fingerprint distortion detection unit detecting whether or not the finger is properly put on the fingerprint reading face of the fingerprint sensor; and a notification unit notifying, if the result of the detecting by said fingerprint distortion detection unit is negative, a third entity of the result of the detecting, wherein the fingerprint sensor includes a printed pattern corresponding to the fingerprint distortion detection unit and detecting movement of the finger, and said fingerprint distortion detection unit measures an amount of movement of the pattern to judge whether or not the finger is properly put on the fingerprint reading face of the fingerprint sensor.

2. A fingerprint sensor for reading a fingerprint image of a finger put on a fingerprint reading surface, comprising:

a printed pattern on the fingerprint reading surface detecting an amount of movement of the finger; and a fingerprint distortion detection unit corresponding to the pattern and measuring an amount of movement of the pattern and judging whether or not the finger is properly put on said fingerprint reading face.

3. A fingerprint matching apparatus according to claim 1, wherein, if the result of the detecting by said fingerprint distortion detection unit is negative, said fingerprint distortion unit judges whether or not the number of negative rejections is equal to or smaller than a predetermined number, and if the result of the judging is positive, allows re-putting the finger on the fingerprint reading face.

4. A fingerprint matching apparatus according to claim 1, wherein, if said fingerprint distortion detection unit does not succeed in detecting that the finger is properly put on the fingerprint reading face of the fingerprint sensor in a predetermined time period, the fingerprint sensor does not read the fingerprint image of the finger any longer.

5. A fingerprint matching apparatus according to claim 1, wherein said fingerprint distortion detection unit is arranged on and fixed to the fingerprint reading face of the fingerprint sensor, said fingerprint distortion detection unit includes a transparent elastic film on which a pattern for detecting an amount of distortion is attached to serve as the pattern for detecting movement of the finger, and said fingerprint distortion detection unit measures an amount of movement of said pattern to judge whether or not the finger is properly put on the fingerprint reading face of the fingerprint sensor.

6. A fingerprint matching apparatus according to claim 1, wherein said fingerprint distortion detection unit is arranged on and semi-fixed to the fingerprint reading face of the fingerprint sensor, said fingerprint distortion detection unit includes a transparent elastic film on which a pattern for detecting an amount of distortion is attached to serve as the pattern for detecting movement of the finger, and said fingerprint distortion detection unit measures an amount of movement of said pattern to judge whether or not the finger is properly put on the fingerprint reading face of the fingerprint sensor.

7. A fingerprint sensor according to claim 2, wherein said fingerprint distortion detection unit is arranged on and fixed to the fingerprint reading face and includes a transparent elastic film on which a pattern for detecting an amount of distortion is attached to serve as the pattern for detecting movement of the finger, and said fingerprint distortion detection unit measures an amount of movement of said pattern to judge whether or not the finger is properly put on the fingerprint reading face.

8. A fingerprint sensor according to claim 2, wherein said fingerprint distortion detection unit is arranged on and semi-fixed to said fingerprint reading face and includes a transparent board on which a pattern for detecting an amount of movement is attached to serve as the pattern for detecting movement of the finger, and said fingerprint distortion detection unit measures an amount of movement of said pattern to judge whether or not the finger is properly put on said fingerprint reading face.

* * * * *